United States Patent [19]

Hong

[11] Patent Number: 5,764,924
[45] Date of Patent: Jun. 9, 1998

[54] METHOD AND APPARATUS FOR EXTENDING A LOCAL PCI BUS TO A REMOTE I/O BACKPLANE

[75] Inventor: Soon Chul Hong, San Diego, Calif.

[73] Assignee: NCR Corporation, Dayton, Ohio

[21] Appl. No.: 518,947

[22] Filed: Aug. 24, 1995

[51] Int. Cl.⁶ ............................................. G06F 13/00
[52] U.S. Cl. ................................. 395/281; 395/306
[58] Field of Search ........................... 395/281, 287, 395/306, 308, 309

[56] References Cited

U.S. PATENT DOCUMENTS

| | | | |
|---|---|---|---|
| 4,959,833 | 9/1990 | Mercola et al. | 371/32 |
| 5,001,625 | 3/1991 | Thomas et al. | 395/281 |
| 5,488,705 | 1/1996 | LaBarbera | 395/309 |

OTHER PUBLICATIONS

"PCI Local Bus Specification", Production Version, Revision 2.0, PCI Local Bus, Apr. 30, 1993.

*Primary Examiner*—Ayaz R. Sheikh
*Assistant Examiner*—Jeffrey K. Seto
*Attorney, Agent, or Firm*—Merchant, Gould, Smith Edell, Welter & Schmidt

[57] ABSTRACT

A method and apparatus for extending a PCI bus interface to a remote I/O backplane through a high speed serial link, providing a large number of I/O slots to alleviate packaging requirements. The apparatus includes a local and a remote serial bridge coupled by a serial link, which is used to transceive messages. Each serial bridge may reside either on a PCI add-in card, or directly on a motherboard. The bridge uses data buffering and a handshaking request and acknowledge protocol to assure accurate and timely data transfer.

65 Claims, 19 Drawing Sheets

METHOD AND APPARATUS FOR EXTENDING A LOCAL PCI BUS TO A REMOTE I/O BACKPLANE

BACKGROUND OF THE INVENTION

1. Field of the Invention

The present invention relates generally to an apparatus for extending one or more local buses to a remote I/O backplane, and in particular, a method and apparatus for extending a local PCI bus to a remote I/O backplane.

2. Description of Related Art

The PCI local bus is a high performance 32 or 64-bit bus with multiplexed address and data lines. The PCI local bus was defined to establish an industry standard for high performance local bus architecture offering low cost. The PCI component and add-in card interface is processor-independent, enabling an efficient transition to future processor generations, and may be used with multiple processor architectures. This processor-independence allows the PCI local bus to be optimized for I/O functions, enabling concurrent operations of the local bus with the processor/memory subsystem, and accommodating multiple high performance peripherals in addition to graphics such as motion video, SCSI, and hard disk drives.

The movement to enhance the video and multi-media displays of high definition TV and other three-dimensional or high bandwidth I/O will continue to increase local bus bandwidth requirements. The PCI interface is particularly useful in interconnecting highly integrated peripheral controller components, peripheral add-in boards, and processor/memory systems. The PCI interface standard also offers additional benefits to users of PCI-based systems. Configuration registers are specified for PCI components and add-in cards. A system with embedded auto-configuration software, it offers true ease of use for the system user by automatically configuring PCI add-in cards at power-on. The PCI Local Bus Specification, Rev. 2.0, incorporated herein by reference, defines the PCI interface protocol, electrical, mechanical, and configuration specifications for PCI local bus components and expansion boards.

The current PCI bus specification limits the maximum number of add-in cards. When operating at 33 MHz, the number of add-in cards is limited to four, and when operating at 66 MHz, the PCI bus specification limits the maximum number of add-in cards per bus to two. With the increased processor performance, more I/O functions and higher I/O bandwidths are required to maintain high performance. This translates into a requirement for a large number of I/O adapter card slots. It may be possible if a system adopts a hierarchical I/O bus structure by using many levels of PCI-to-PCI bridges, but packaging requirements limit the number of I/O adapter slots. Also, the multiple levels of bridging incurs longer and potentially unacceptable data latency values.

SUMMARY OF THE INVENTION

To overcome the limitations in the prior art described above and to overcome other limitations that will become apparent upon reading and understanding the present specification, the present invention discloses a method and apparatus for extending one or more processor buses to a remote I/O backplane. The method comprises the steps of receiving a message from a local bus, generating a serial request packet from the local bus message when the bus message is targeted to the remote I/O backplane, transmitting the serial request packet over a serial link, receiving a serial response packet when specified by the serial request message over the serial link, the serial response packet defining a local bus operation, and performing the local bus operation indicated by the serial response packet. The method also comprises the steps of receiving a serial request packet defining a bus operation from the remote I/O backplane over a serial link, performing the bus operation, and transmitting a signal response packet to the remote I/O backplane. The apparatus comprises a PCI bus interface processor coupled to the PCI bus, a serial link processor for translating bus messages into serial link interface messages and translating serial link interface messages into a bus message, and a serial link interface coupled to the serial link processor and the serial link.

An object of the invention is to provide a fast and reliable serial link message protocol to extend a PCI bus to a remote node. A further object of the invention is to provide an interrupt controller communication bus extension capabilities through the same serial link. Another object of the invention is to provide a modular PCI-to-serial link design architecture for a multi-port switch PCI ASIC which can tightly couple multiple processor nodes and allow replication.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is understood that other embodiments may be utilized and structural changes may be made without departing from the scope of the present invention.

System Overview

Figure 1:
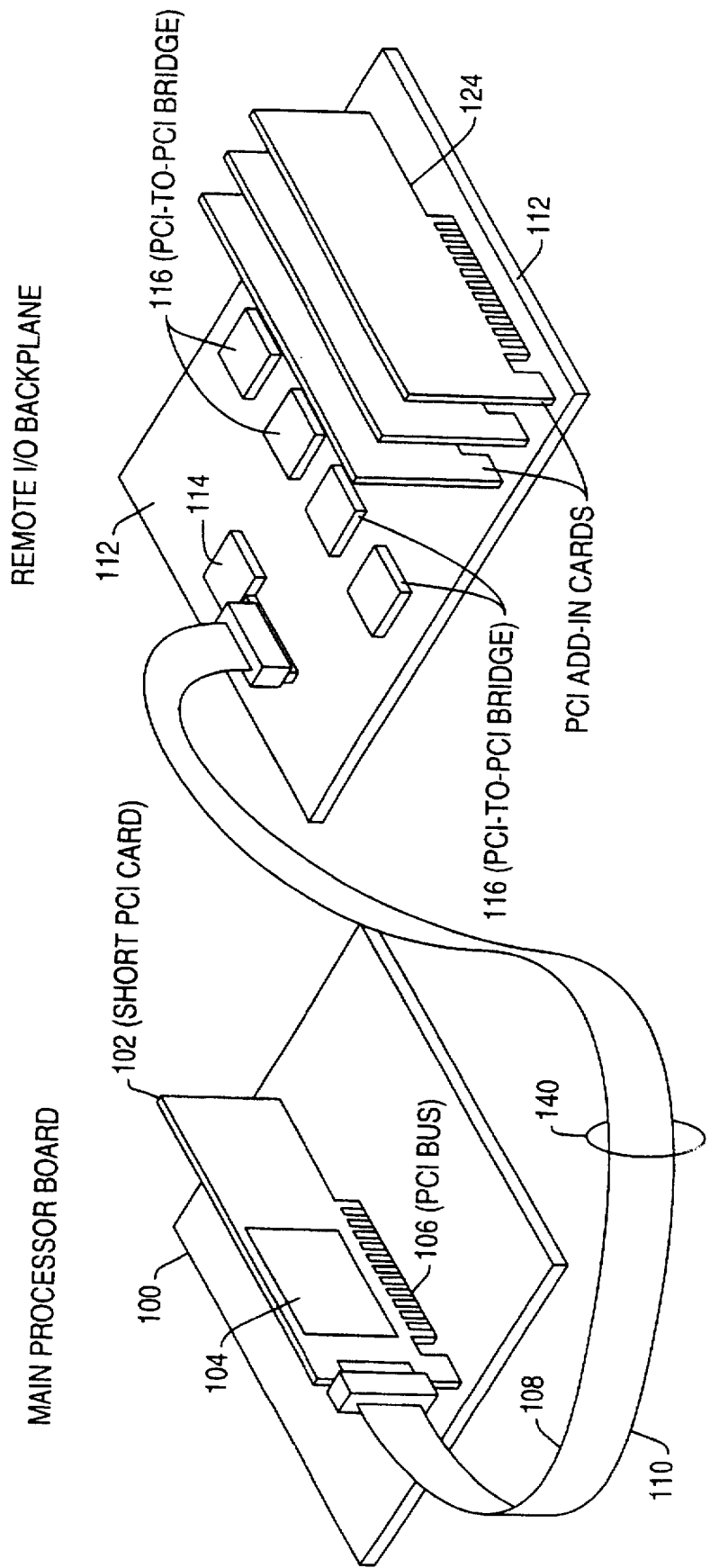
FIG. 1 is a diagram showing a physical implementation of the invention.

FIG. 1 is a diagram showing one possible physical implementation of the invention. FIG. 1 shows a local processor board 100 coupled to a remote I/O backplane 112 by a serial link 140 comprising a first serial link cable 108 and a second serial link cable 110. The serial link 140 is coupled to a PCI add-in card 102, coupled to a PCI bus 106, which connects the PCI card 102 to the local processor board 100. Resident on the PCI card 102 is a local serial bridge 104, which may be implemented on an application specific integrated circuit (ASIC). Similarly, a remote serial bridge 114 is resident on the remote I/O backplane 112, also coupled to the serial link 140. The remote I/O backplane 112 also comprises remote PCI-to-PCI bridges 116 and a plurality of remote PCI add-in cards 124.

The local serial link 104 and the remote serial link 114 may reside either in a PCI add-in card or directly on the mother board in a primary implementation. The dual serial links may be copper cables, fiber optics, or any other transmission medium of suitable bandwidth. Each remote I/O cabinet 112 may contain up to 16 PCI adapters through the four remote PCI-to-PCI bridges 116 as shown.

Since the serial bridges translate PCI bus protocols to serial bus protocols and serial bus protocols to PCI bus protocols, the same type of serial bridge is used in the local processor board 100 and the remote I/O backplane 112 to communicate between the PCI bus 106 on the processor board and the PCI bus on the remote I/O backplane 112. The local serial processor 104 and the remote serial processor 114 are coupled through two differential pairs of unidirectional coaxial cables or optical fibers 140 at a frequency up to or higher than 1 gigabit per second.

Figure 2:
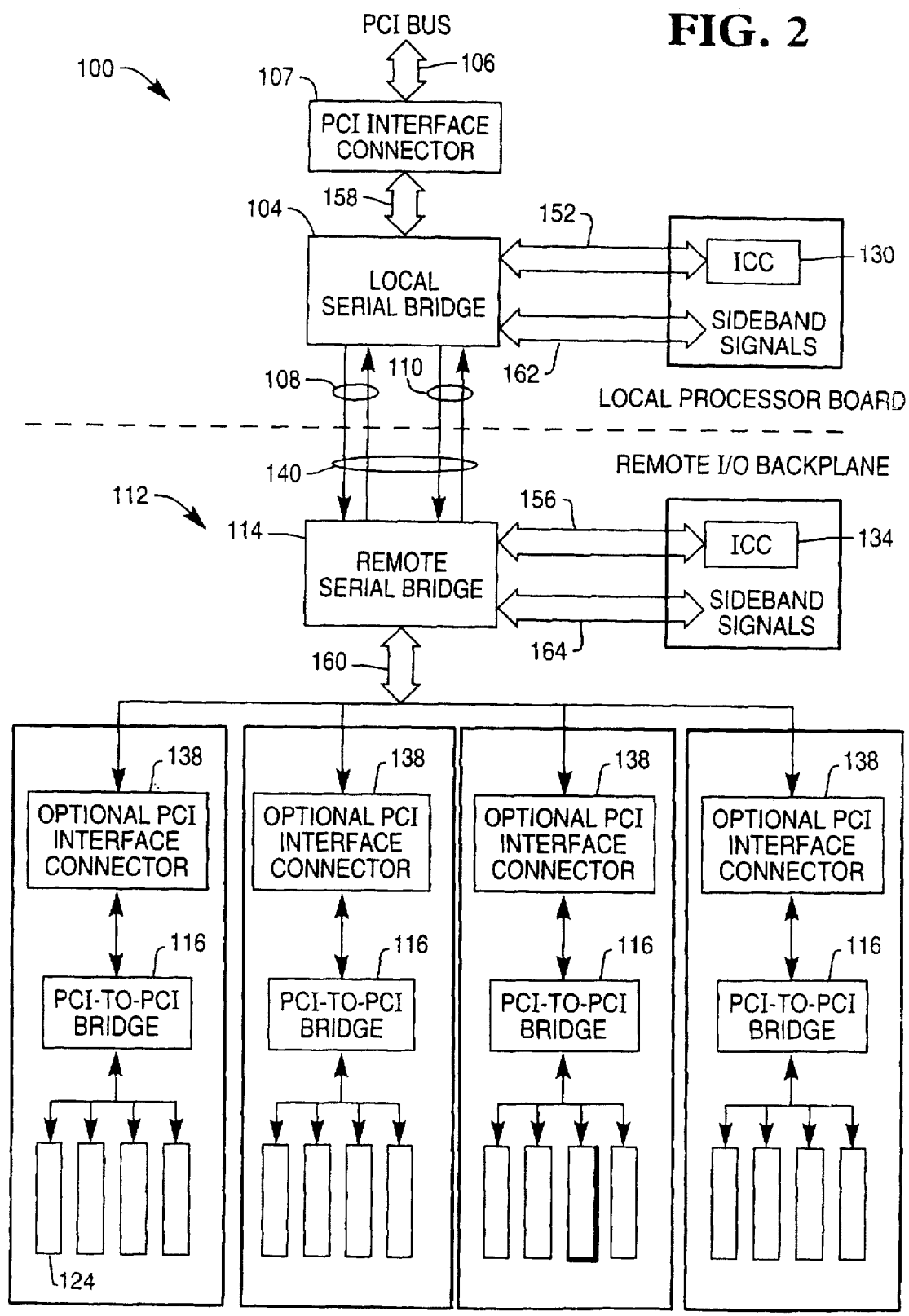
FIG. 2 is a top-level block diagram of one embodiment of the present invention.

FIG. 2 is a top level block diagram of one embodiment of the present invention. As shown in FIG. 2, the local PCI bus 106 is coupled to the local serial bridge 104 via a PCI interface connector 107 and a local PCI interface 158 thereby providing communications from the PCI bus 106 to the local serial bridge 104. The local serial bridge 104 is coupled to the remote serial bridge 114 via a serial link 140 comprised of a first serial link cable 108 and a second serial link cable 110. The remote serial bridge 114 may be optionally coupled to remote PCI interface connectors 138 via a remote PCI interface 160. These remote PCI interface connectors 138 are optional since the remote serial bridge 114 can be connected directly to four PCI-to-PCI bridges 116. The remote PCI interface connectors 138 provide communication between the remote serial bridge 114 and a plurality of PCI-to-PCI bridges 116. These bridges in turn provide communication with up to 16 PCI adapters or remote PCI add-in cards 124. The present invention also supports the extension of JTAG and Interrupt Control Communication (ICC) buses through a serial link. The JTAG interface is described in the PCI Specification, which is incorporated by reference herein. If either the remote serial bridge 114 or the local serial bridge 104 are mounted directly on a motherboard in a planary configuration, the ICC, JTAG, and sideband signal interfaces are coupled directly to the motherboards shown in the dashed boxes of FIG. 2. However, if the remote serial bridge 114 or the local serial bridge 104 are implemented on a PCI add-in card (a non-planary implementation), the ICC, JTAG, and sideband messaging must be accomplished through the PCI interfaces 106, 160.

As shown in FIG. 2, the local serial bridge 104 is coupled to a local ICC bus 130 via a local ICC interface 152. Similarly, the remote serial bridge 114 is coupled to a remote ICC bus 134 via a remote ICC interface 156 respectively. Finally, sideband signals are provided to and received from the local serial bridge 104 and the remote serial bridge 114 via the local sideband signal interface 162 and the remote sideband signal interface 164.

Figure 3A:
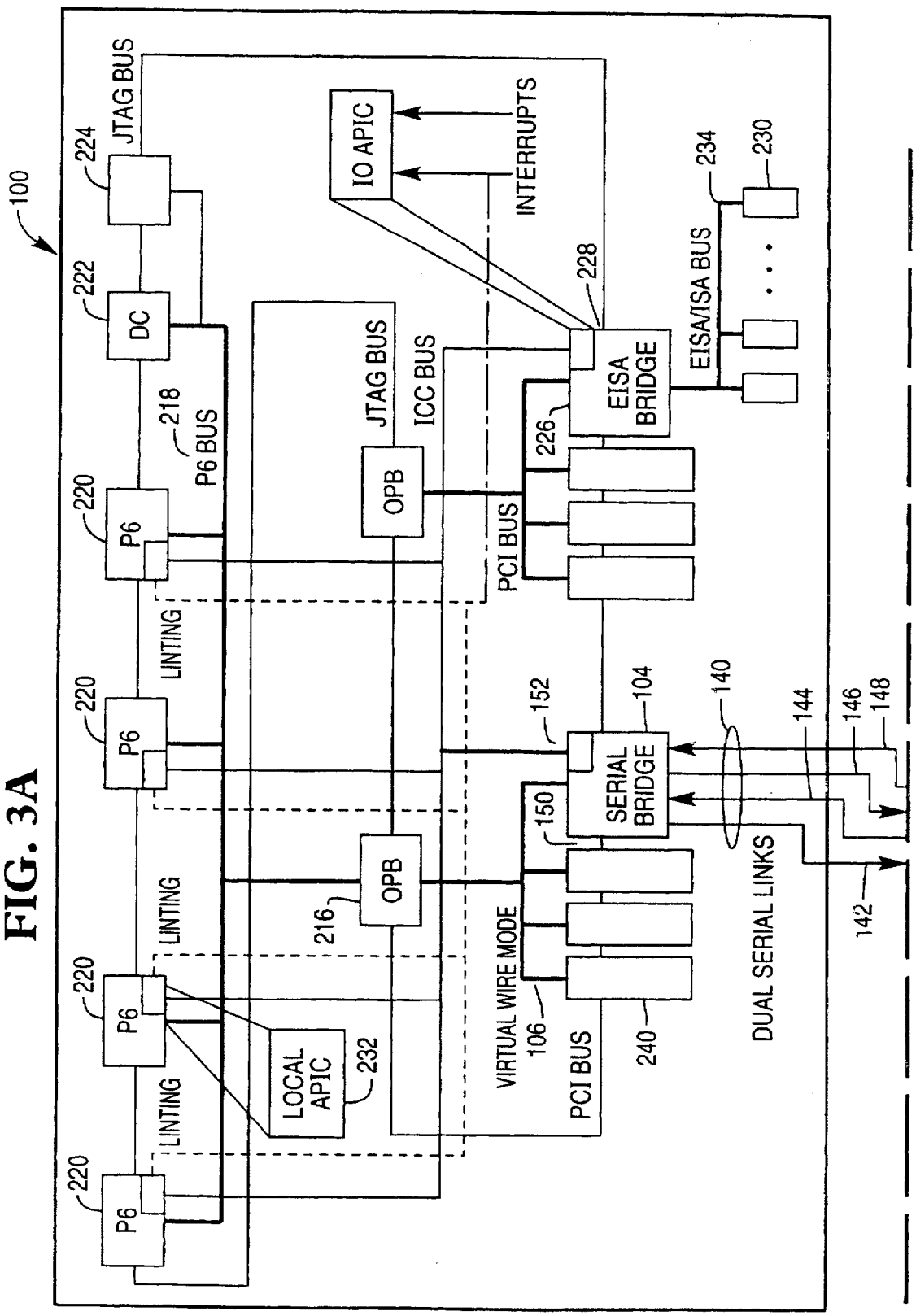
FIGS. 3A and 3B together are a block diagram illustrating a specific implementation of one embodiment of the present invention.
Figure 3B:
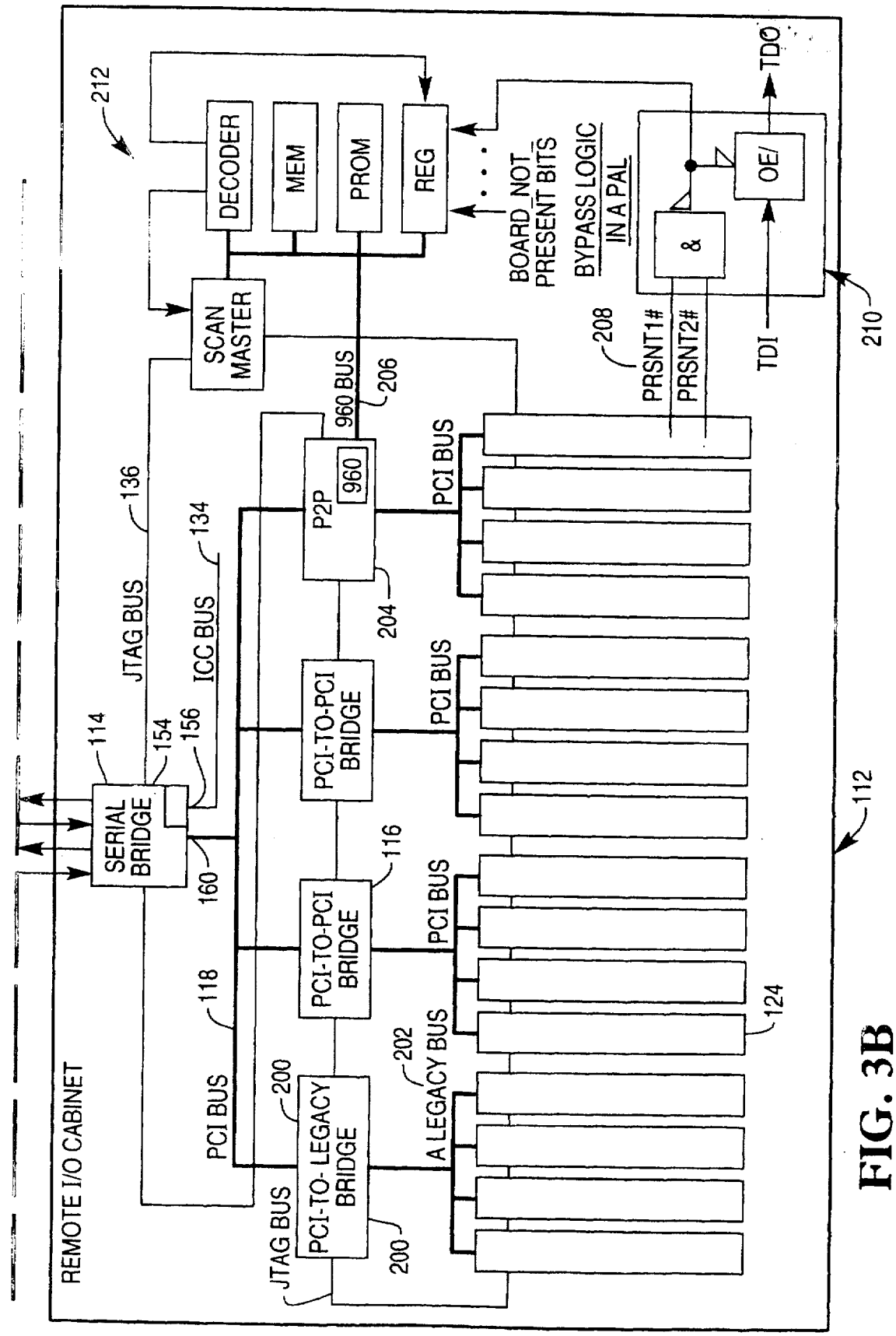

FIG. 3 is a block diagram illustrating a specific implementation of the present invention. As shown in FIG. 3, the local processor board 100 may comprise several local processors 220 and associated data controllers 222 and datapaths 224. The local processors 220 may be next-generation P6 devices such as the INTEL ORION device. These local processors 220 are coupled to the local PCI compliant devices 240 by a Local Processor-to-PCI bridge 216, and a local PCI bus 106. The local serial bridge 104 is coupled to the local PCI bus 106 and to the serial link 140. The remote serial bridge 114 is also coupled to the serial link 140, and transmits and receives serial messages from the local serial bridge 104. PCI compliant devices 124 in the remote I/O backplane 112 are coupled to the remote serial bridge 114 via the remote PCI interface 160.

FIG. 3 also shows how JTAG messages are transceived over the serial link 140. The first SPCI may be implemented in the local processor board 100 in either a planary or PCI add-in card configuration. In a planary configuration, the serial bridge 104 is directly coupled to the JTAG bus from the local processors 220. JTAG messages from the local processor board 100 are received by the remote serial bridge 114 from the serial link 140. If the remote serial bridge is also in a planary implementation, JTAG messages are provided on the remote JTAG interface 154. In a non-planary configuration, the JTAG signals on the standard PCI connector interface will be used by both the local serial bridge 104 and the remote serial bridge 114.

FIG. 3 also shows how ICC messages are transceived over the serial link 140. In a planary configuration, the local serial bridge 104 communicates with the local processor advanced programmable interrupt controllers (APICs) 232 directly through the ICC bus. If the serial bridge is implemented in an add-in card, interrupt messages are communicated indirectly through another APIC or in a virtual wire mode. Similarly, if the remote serial bridge in the remote I/O backplane is configured in a planary implementation, interrupt messages can be transmitted from the serial bridge directly over the remote ICC interface 156. If not, either PCI compliant signals must be multiplexed or an additional connector has to be added.

FIG. 3 also shows one implementation in which an EISA/ISA bus 234 is extended to a remote I/O backplane 112. As shown in FIG. 3, EISA/ISA compliant devices 230 may communicate with the local serial bridge 104 and hence the remote I/O backplane 112. The EISA/ISA compliant device 230 is coupled to a PCI-to-EISA bridge 226 via a EISA/ISA bus 234. Similarly, the PCI-to-EISA bridge 226 is coupled to the local processor-to-PCI bridge 216 by a second local PCI bus 126.

Serial Bridge Description

Figure 4A:
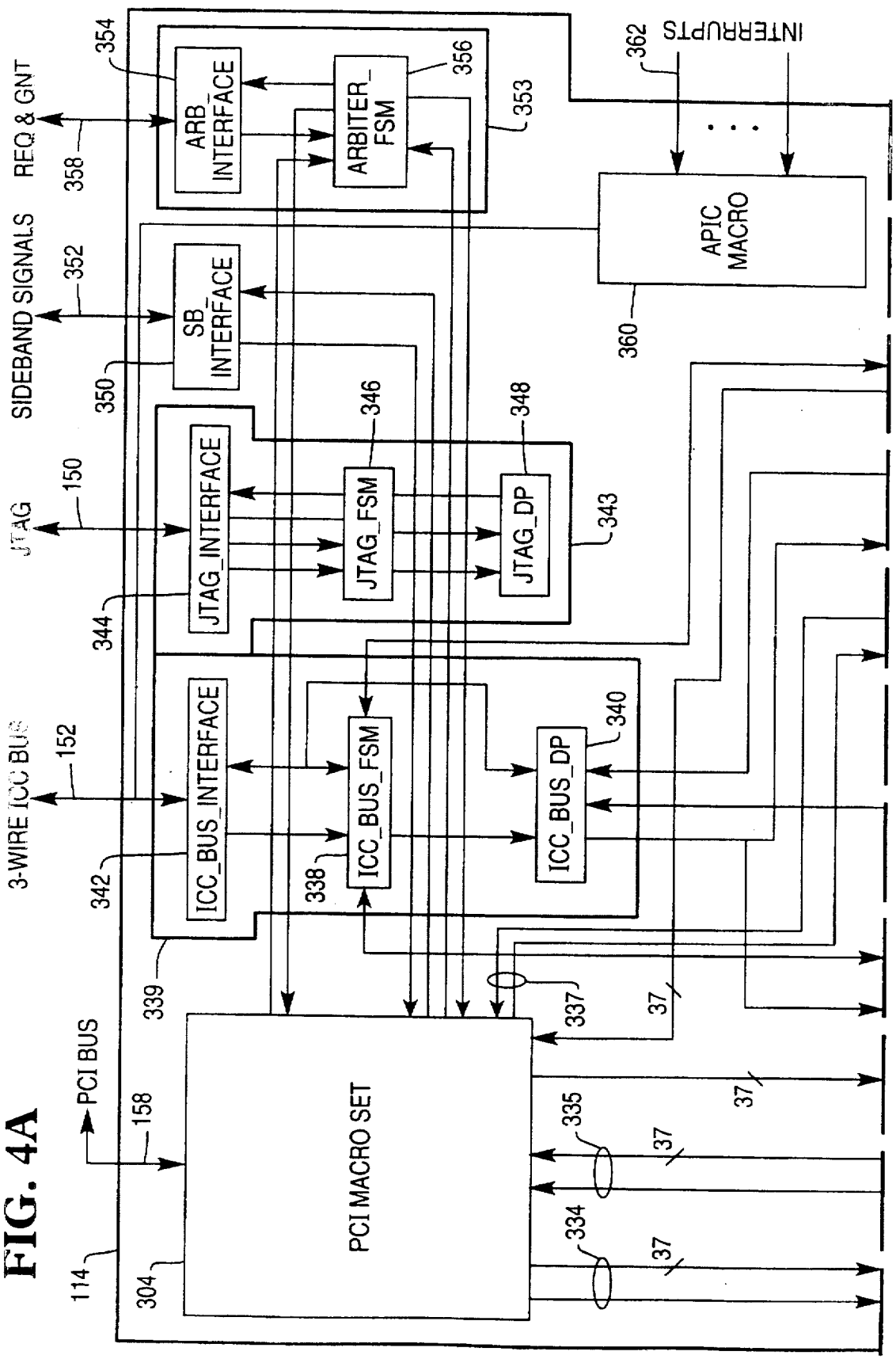
FIGS. 4A and 4B together are a block diagram illustrating the serial bridges of the present invention.
Figure 4B:
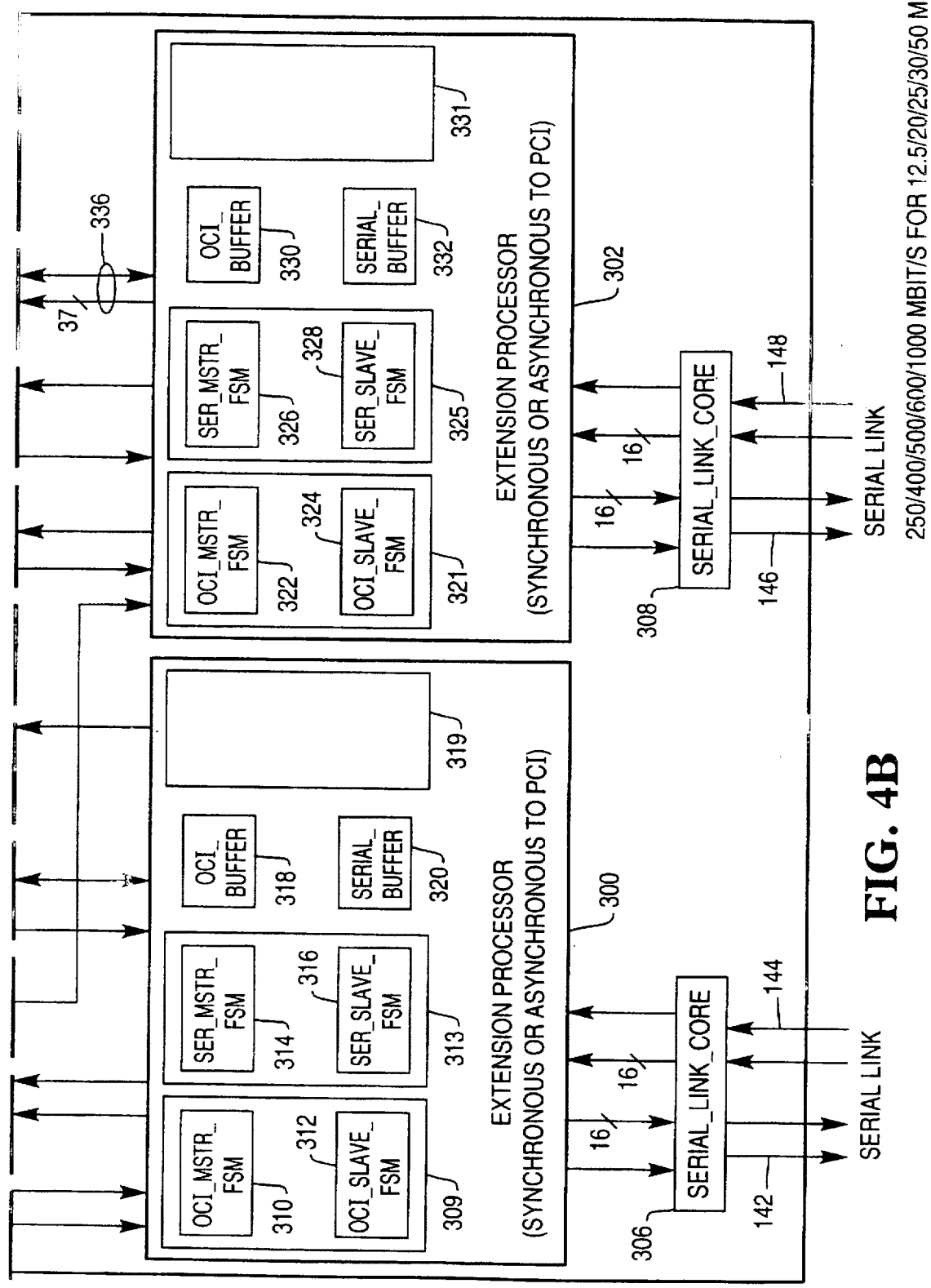

FIG. 4 is a block diagram of one embodiment of the serial bridges 104 and 114 of the present invention. The local serial bridge 104 comprises a PCI macro set 304 which is coupled to the local PCI interface 158. The PCI macro set 304 is an off-the shelf device such as DESIGNWARE components available from SYNOPSIS. The PCI macro set 304 is also coupled to a first extension processor 300 and a second extension processor 302, which perform identical functions. Two extension processors are used to provide redundant communication links in case of link failure. The first and second extension processors 300 and 302 are also coupled to a first serial cable interface 306, and a second serial cable interface 308, respectively. The serial cable interfaces translate serial messages over the serial link 140 into parallel messages for the first and second extension processors 300 and 302. The serial link operates either synchronously or asynchronously to the PCI bus clock. If the serial link is asynchronous, it must ordinarily operate at a higher frequency than the PCI bus clock.

The first extension processor 300 comprises a PCI bus interface 309, a serial link interface 313, PCI buffers 318, serial buffers 320, and a configuration register 319. The PCI bus interface 309 includes a PCI master logic module 310 and a PCI slave logic module 312. Similarly, the serial link interface 313 includes a serial link master logic module 314, and a serial link slave logic module 316. Similarly, the second extension processor 302 also comprises a PCI bus interface 321 including a PCI master logic module 322 and a PCI slave module 324, a serial link interface 323 including a serial link master logic module 326 and a serial link slave logic module 323, PCI buffers 330, serial buffers 332 and a configuration register 331. The configuration register 319 in the first extension processor 300 and the configuration register 331 in the second extension processor 302 support PCI configuration, initialization, and catastrophic error handling. Each configuration register comprises a pre-defined device independent configuration register region and a device specific region. The predefined device independent configuration register region contains fields for unique identification and control. The fields within the device independent configuration register region are summarized in Table 1. The operation of this portion of the configuration register is generally described in the PCI local bus specification incorporated by reference. The fields within the device specific region of the configuration register shown in Table 2 are used for implementing the extension processor 300 functions described herein. The functions and defining fields for PCI bus control using the device specific region are shown in Table 6. The functional operation of the PCI bus interface 309 and the serial link interface 313 is described in greater detail below.

In addition to the functions provided by the local serial bridge 104, the remote serial bridge 114 on the remote I/O backplane 112 provides integrated PCI bus arbitration logic and a focal point for local interrupts for its subordinate PCI modules. To accomplish this, the remote serial bridge 114 in the remote I/O backplane 112 further comprises a programmable PCI bus arbitration controller 353, and an Interrupt Controller Communication (ICC) bus interface processor 339. Of course, while not required to practice the present invention, the programmable PCI bus arbitration controller 353 and the bus interface processor may be implemented in the local serial bridge 104 as well.

The programmable PCI bus arbitration controller 353 and the ICC bus interface processor 339 will now be described. The programmable PCI bus arbitration controller 353 comprises an arbitration interface module 354, and an arbitration logic module 356. Since the maximum number of planary modules/bus is eight, the arbitration logic module 356 can support up to eight PCI modules, so that there will be eight request and grant signal pairs 358. Since integrated arbitration logic cannot be used with the local serial bridge 104 in the local processor board 100, external arbitration logic using a single pair of the eight pins is required.

The ICC bus interface processor 339 is coupled to the first extension processor 300, the second extension processor 302, and the processor ICC interface 152. The ICC bus interface processor 339 comprises an ICC bus interface 342 coupled to the processor ICC interface 152, an ICC bus interface logic module 340, and an ICC bus interface data module 340. Since the I/O APIC function is the only focal point for local interrupts in the remote I/O backplane 112, the APIC macro 360 is required in the remote serial bridge 114. However, in the local serial bridge 104, the operation of the ICC bus interface processor 339 with the ICC interface 152 may optionally be controlled by an APIC macro 360, which is responsive to APIC module interrupt inputs 362.

If the local serial bridge 104 is connected planarly to the motherboard, the SPCI interrupt controller may communicate directly with local APICs though the processor ICC interface 152. However, if the serial bridge is mounted on a PCI add-in card in a non-planary implementation, the SPCI interrupt controller uses the INTB, INTR, and INTD PCI add-in card connector pins described in the PCI interface specification. Alternatively, the PRSNT 1# and PRSNT 2# signals on the PCI interface can be multiplexed with interrupt signals, using a divided-down derivative of the PCI clock for the ICC bus clock. Further information on this technique is disclosed in the commonly assigned application Ser. No. 08/518,739 filed Aug. 24, 1995, by Soon Hong, entitled "Method and Apparatus for Multiplexing Bus Connector Signals with Sideband Signals", which application is hereby incorporated by reference. Finally, when the remote serial bridge 114 is mounted planarly on the remote I/O backplane 112, it may receive up to sixteen interrupt signals directly from PCI add-in cards 124 and transmit interrupt information over the serial link 140. The operation of the ICC bus interface processor is further described with reference to FIGS. 6A–6D, 7A–7C and 8A–8B herein.

In another embodiment of the invention, the local serial bridge 104 and the remote serial bridge 114 also comprise a sideband interface 350 coupled to sideband signals 352 and the PCI macro set 304. Sideband signalling is especially useful when the PCI bridge is used to interface with a legacy bus without a backoff capability, such as an MCA or EISA/ISA. When interfacing with legacy buses of this type, a deadlock situation may be encountered. To prevent deadlock occurring, at least two sideband signals—flush request and flush acknowledge—must be available throughout the PCI bus hierarchy. The use of flush request and flush acknowledge messages to avoid deadlock with a EISA/ISA bus is discussed in "Advance Information" 82375EB §§5.4.6, 5.4.6.2, and 5.4.6.3, incorporated by reference herein.

In the embodiment described above, sideband signals are extended to the remote I/O backplane using the serial link. If the PCI add-in card is mounted on the motherboard in a planary manner, the sideband signals can be input directly to the serial bridge by the sideband signal interface 352. However, in non-planary implementations, the sideband signal must be multiplexed on the PCI bus 158. This can be accomplished using the PRSNT 1# and PRSNT 2# signals as described in a co-pending application for "Method and Apparatus for Multiplexing Bus Connector Signals with Sideband Signals" by Soon Hong and assigned to the assignee of the present application.

Finally, in another embodiment of the invention, the serial bridge also comprises a JTAG interface processor 343, comprising a JTAG interface module 344 coupled to a standard 5-pin JTAG interface 150 and to a JTAG interface logic module 346. The JTAG interface logic module 346 is also coupled to a JTAG data module 348 for data. The JTAG interface processor 343 provides a test interface for the system. As with the ICC bus and sideband signals, if the serial bridge is not in a planary implementation, the PCI interface JTAG TDK, TDL, TDO, TMS, and TRST# signals (as described in the PCI specification) are used for messaging.

Extension Processor—PCI Bus Interface

The PCI bus interface 309 protocol supports the Dual Address Cycle (DAC) in both directions. This allows 64-bit memory addressing. To store data from the directly connected remote PCI-to-PCI bridges 116, each PCI bus data path contains four sets of buffers, including PCI buffers 330, and serial buffers 332 for posting write data and read data. This is effectively one set of buffers per single PCI adapter module. Each set of buffers has a 64-bit address buffer and a 32 byte (equivalent to a line size) data buffer. Therefore, the total buffer size for a pair of serial bridges is 512 bytes (2 SPCI ASICs×2 PCI data paths×4 sets of buffers×32 bytes/buffer).

To maximize PCI bus bandwidth, each serial bridge supports the PCI retry/disconnect protocol described in the PCI specification herein incorporated by reference. If this mode is enabled programmatically through the configuration registers described in this specification, the serial bridge will respond with a retry response without any data transfer to the PCI master. In this situation, the master initiates a read operation to a remote target and the serial bridge captures the address and initiates a read operation to a remote target through the serial link 140. Once data is returned from the remote target, it is buffered in the serial bridge. Later, when the PCI master "retries," the serial bridge provides the data with no further retry response. This process is summarized in FIGS. 6A–6D, 7A 7B–7C and is described in further detail below under "Extension Processor—Operations."

Extension Processor—Serial Link Interface

As previously discussed, each serial bridge nominally comprises a first extension processor 300 and a second extension processor 302. Each extension processor has its own private serial link cable 108 and 110 to communicate with other serial bridges. The serial link cables 108 and 110 have differential transmit and receive channels totaling four wires that is used to send and receive PCI bus operations to and from its associated PCI bus interface.

Figure 5:
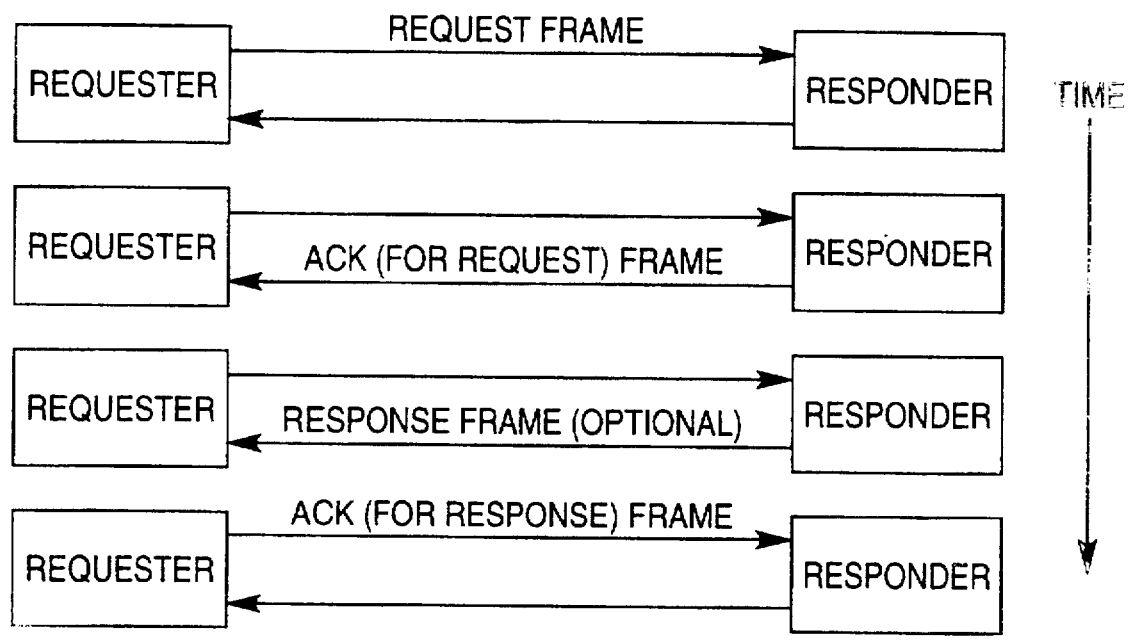
FIG. 5 is a diagram showing the request and acknowledge protocol of the present invention.

The serial link interface enforces a request-and-wait-for-acknowledge handshaking protocol. This protocol is summarized in FIG. 5. As shown in FIG. 5, a request frame is sent by the requesting entity to the responding entity over the serial link. The requesting entity may be a PCI compliant device in the local processor board 100 or in the remote I/O backplane 112, or another entity using an ICC bus or supplying a sideband signal. The responding entity responds initially by transmitting an acknowledge frame to the requester which acknowledges the successful receipt of the request frame. Thereafter, if the request frame so requires, the responding entity sends a response message. Finally, to confirm that the response was received, the requesting entity transmits an acknowledge frame. This handshaking protocol ensures an orderly and reliable delivery of messages which comprise a header (control) and payload (address and/or data) packet.

The message format is summarized in Table 3, which shows the structure of the messages sent from the responding and requesting parties. As shown in Table 3, the full size frame format for a serial message or packet includes a 16-bit flag, a 16-bit header, and a payload. The payload may comprise either an address, data, or both an address and data, depending on whether the whether the message type is a request frame, an acknowledge frame, or a response frame.

The flag is a 0xF09C pattern with an asserted SYNC signal. The header is 16 bits in length, and the first two bits indicates the packet type, i.e. whether the serial message is a request packet, a response packet, or an acknowledge packet. The code for the header of the packet is presented in Table 4. The next four bits of the serial messages comprise the operations code for the packet. As shown, different operations codes are available for each packet type.

Since each serial message is of limited length, PCI payloads that exceed the serial message length must be segmented. In this case, each packet will include an operations code indicating whether the message contains the beginning of a new payload, a continuation of the previous payload, or the end of the payload. The operations code also supports other commands as described in Table 4. The remaining header bits contain information regarding address and data length for PCI and turn-around commands, transaction identification, and parity bits. This simple data packet format encapsulates all necessary PCI bus operations.

The media for the serial link 140 can be either a coaxial cable or optical fiber and each link can be operated in excess of 1Gbit/second, resulting in a peak bandwidth for each link in excess of 100 MB/sec. Effective bandwidth will vary greatly depending upon total latency to memory, ratio of write operations to read operations, and contention for PCI bus bandwidth from other PCI bus adapters. Encoding is employed on the serial link interface to provide DC signal balance and to allow clock re-synchronization at the receiver.

Data integrity is maintained across the serial interface by passing the PCI bus module-generated parity bits through the payload packet and generating an 8-bit error correcting code (ECC) for each 37-bit data in the payload, comprising 32 bits of address or data, a 4-bit CMD/BE and a 1-bit parity. If an error is reported by a receiver, then the sender can retransmit the same message an additional time. Table 5 shows the 6-bit and 8-bit error correcting code used in the serial link for both the 10/24 bit ICC bus messages, and the 37-bit PCI messages, respectively. Table 5 shows the mapping from the ECC to indicate the defective bit in a message packet.

Extension Processor—Operations

Figure 6A:
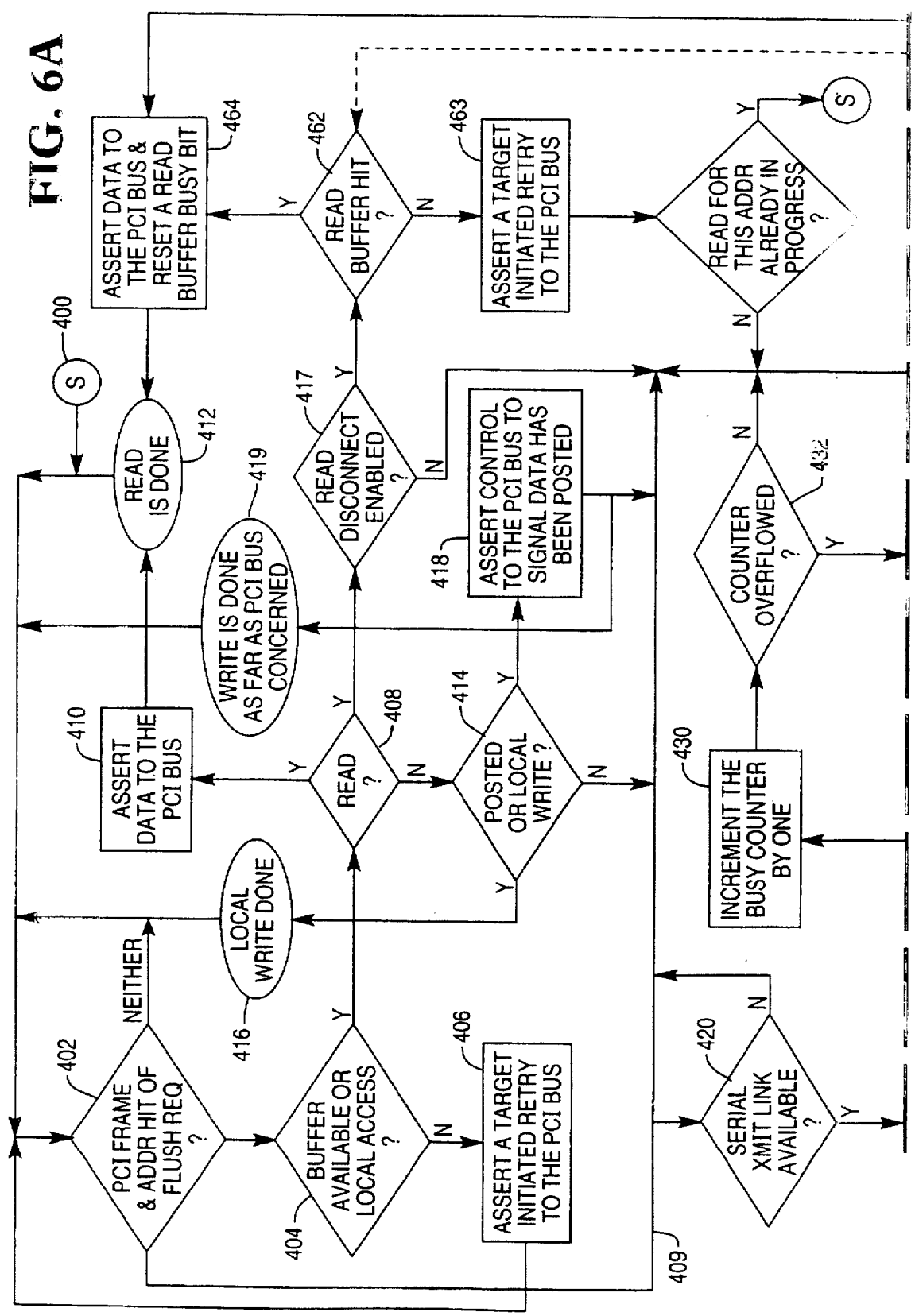
FIGS. 6A–6D together present a flow chart illustrating one embodiment of the invention which employs PCI bus, slave and serial link master operations.
Figure 6B:
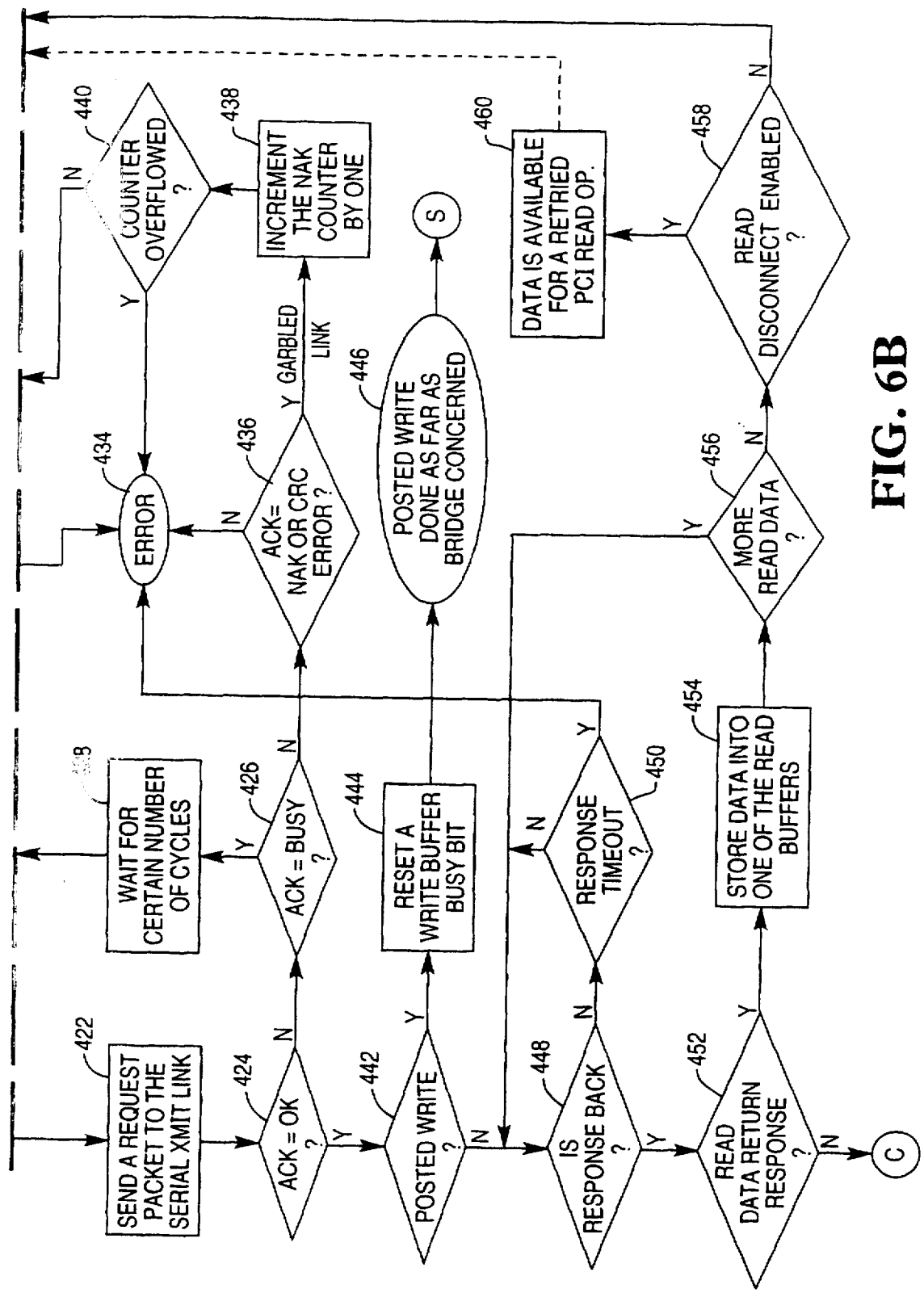

FIGS. 6A–6D, 7A–7C, and 8A–8B depict the operations performed by the extension processor 300, including the PCI bus interface 309, the serial link interface 313, the PCI buffers 318, the serial link buffers 320, and the configuration registers 319. The situation depicted in FIGS. 6A–6B occurs when the PCI bus interface 309 is in the slave mode and the serial link interface 313 is in the master mode. Referring now to FIGS. 6A–6B the PCI bus 106 begins in a PCI idle state 400. From this state, the PCI bus, which may be the local PCI bus 106 or the remote PCI bus 118, may provide a flush request to prevent the deadlock situation previously described or a PCI frame and address hit indicating that a read or write operation is desired 402. If a PCI operation is requested, serial link operations begin as indicated at 409. If the PCI bus provides a PCI operation, a check is made to determine the operation is a local operation to the requesting PCI bus or if there is space available in the PCI buffer 318 to store the PCI operation 404. A PCI buffer 318 is required to store the operation unless local access is specified by the PCI operation. If the operation is not a local operation, a target initiated retry is asserted to the PCI bus until a buffer is available 406. If the operation is a local read 408, the data is asserted to the PCI bus 410, completing the read operation 412, and returning the PCI bus to the idle state 400. If the operation is a local write, the operation is performed 416, and the PCI bus is returned to the idle state 400. If the PCI operation is a remote write operation, control is asserted to the PCI bus to indicate that the data has been posted 418. At this point, from the PCI bus perspective, the desired write operation has been performed 419, and the data is sent to the serial link to be transmitted. Conversely, if the write operation is not a posted write operation, the operation is forwarded directly to the serial link to be transmitted.

If the selected PCI bus operation is a read operation, the PCI interface checks to see if the read disconnect is disabled 417. This is indicated by an operations code of 0010 on the response packet as shown in Table 4. If the read disconnect is disabled, it indicates that the data packet represents the last of the data to be read by the PCI interface. If the read buffer is hit 462 the data is asserted to the PCI bus, and a read buffer busy bit is selected 464. If the read buffer has not been hit 462, a target initiated retry is asserted to the PCI bus 463, and this process continues while the data is read from the remote resource.

Serial link operations are also shown in FIGS. 6A–6B. As indicated, upon receiving data for transmission over the serial link, the serial link is queried to determine if a link is currently available 420. If not, the process is retried until a serial link is available. The data is not lost during this process because it resides in the write buffer. Once a serial link becomes available, a request packet is sent to the serial transmit link 422. At this time, a serial link timer begins. After a fixed delay, an acknowledge message (ACK) is received and interpreted. The ACK message is checked to see if it is OK 424, busy 426, or no acknowledge (NAK) 436. If the ACK message is busy 426, the link waits a specified number of cycles, increments a "busy" counter by one 430, and checks to see if this counter has overflowed 432. If it has not, another request packet is sent to the serial link 422. If the counter has overflowed, an error message is supplied 434. The counter for these operations resides in the device specific configuration register as shown in Table 2. Returning to FIGS. 6A–6B if the ACK message is NAK or CRC error, the NAK counter is incremented by one, and checked to see if it has overflowed. A similar process to that which occurs when the ACK message is "Busy" is then performed, namely, the process is repeated until the counter overflows, then an error message is provided. The NAK counter is also located in the device specific configuration space as shown in Table 2. This handshaking protocol assures that the transfer of data across the serial link is orderly and as error free as possible.

If the ACK message is OK, the serial link processes continue as shown in FIGS. 6A–6B. If the PCI operation was a posted write 442, a write buffer busy bit is reset 444, and the posted write is completed. If instead, the PCI operation is a read operation, a response is expected, and the process continues. Since a response is expected, the interface is checked to determine if a response has been received 448. If a response has not been received, a response timer is checked, and if it has timed-out, an error message is provided 434. If the response timer has not timed out, the link waits for the response. Several responses can be received, including the following: read data 452, an indication that a non-posted write was completed 466, a response indicating that there has been an excessive retry/busy attempts 472, a response indicating that there is no DEVSEL response 474 as defined by the PCI interface specification, a response indicating a parity error or error correcting code (ECC) error response 478, a system error response 480, a flush acknowledge response 482, a flush acknowledge response 490, or an APIC End of Interrupt (EOI) response 492.

If the response is returned data 452, the data is stored in one of the buffers and re-read 456 until all of the data in the message is received. The end of a read message is indicated by a response packet operations code of 0010 as shown in Table 4. If the read disconnect has not been enabled 458, the data is asserted to the PCI bus and a read buffer busy bit is reset 464. If the read disconnect is enabled, the data is available for a retried PCI read operation 460.

Figure 6C:
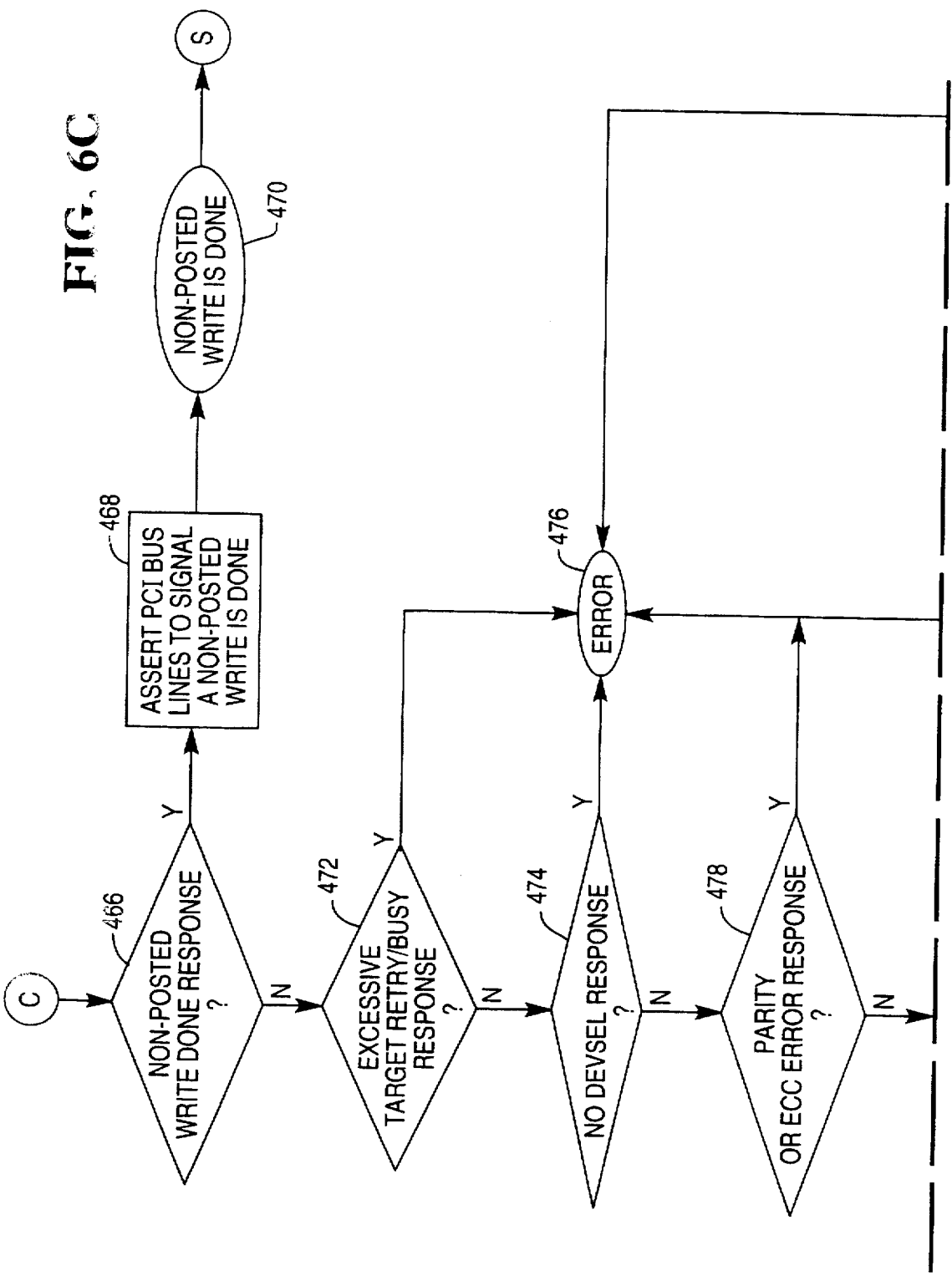
Figure 6D:
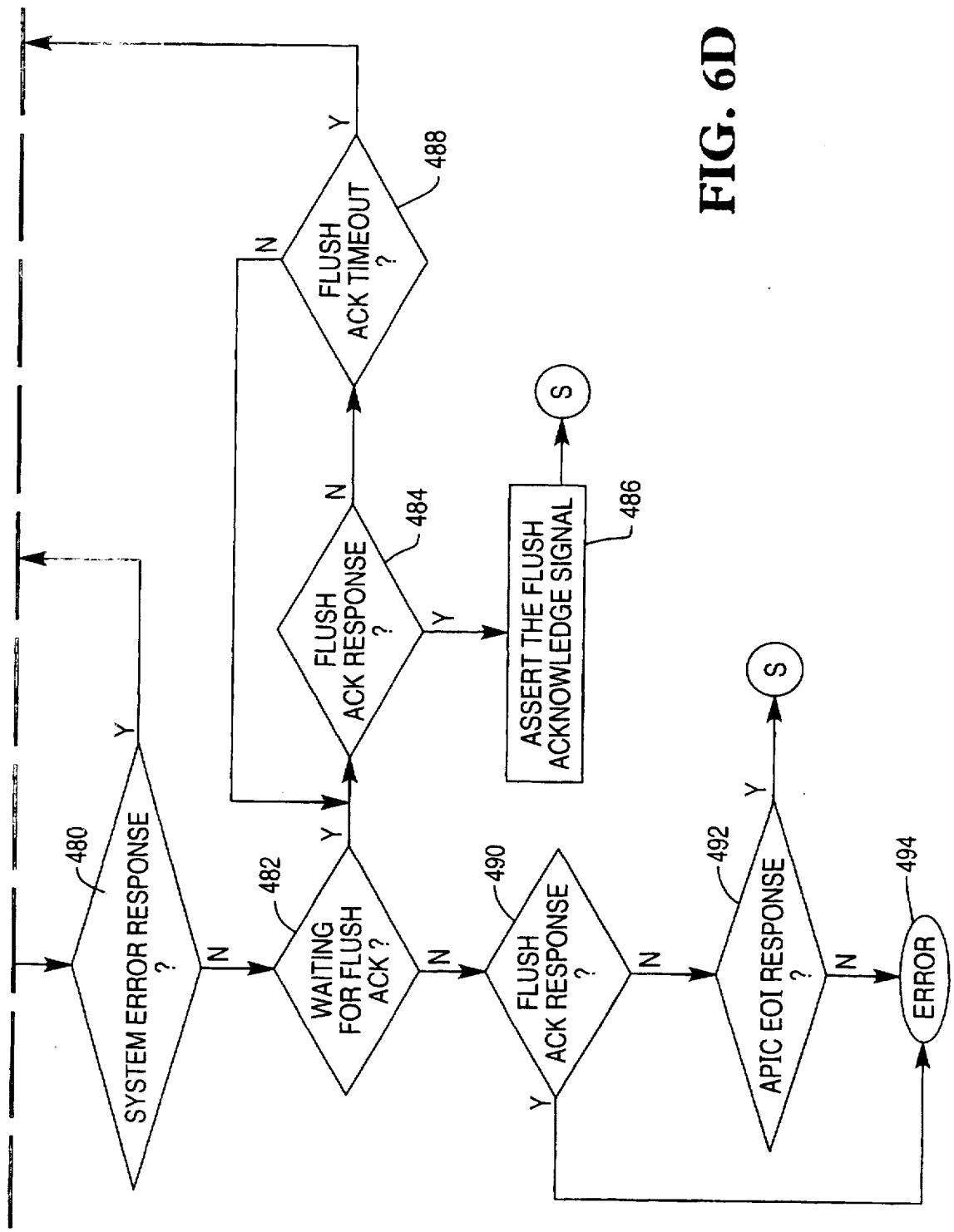

Referring now to FIGS. 6C–6D if the response is an indication that the non-posted write was completed 466, the PCI bus lines are asserted to signal that a non-posted write was completed 470, and the PCI interface is returned to the idle state 400. If the response is an excessive retry/busy indication 472 (indicated by an operations code of 0101 in Table 4), or an indication that no DEVSEL was obtained 474 (indicated by an 0110 operations code), or there is a parity or error correcting code (ECC) response indicating that an error was detected 478 (indicated by an 0111 operations code), or a system error indication is received 480 (indicated by a 1000 operations code), a system error message is transmitted 476. If the command was a flush request command 402 (indicted by a 1001 operations code in the request packet), the expected response is a flush acknowledge response (indicated by a 1001 code in the response packet), and the link awaits the flush acknowledge signal 482 until it is received 484, or until the flush acknowledge signal timer times out 488. If the flush acknowledge signal times out, an error message is transmitted 476. If not, the flush acknowledge signal is asserted, and the PCI interface is returned to the idle state 400. If the response is an APIC EOI response, it is ignored 492 and if it is an undefined response, an error message is transmitted 494.

Figure 7A:
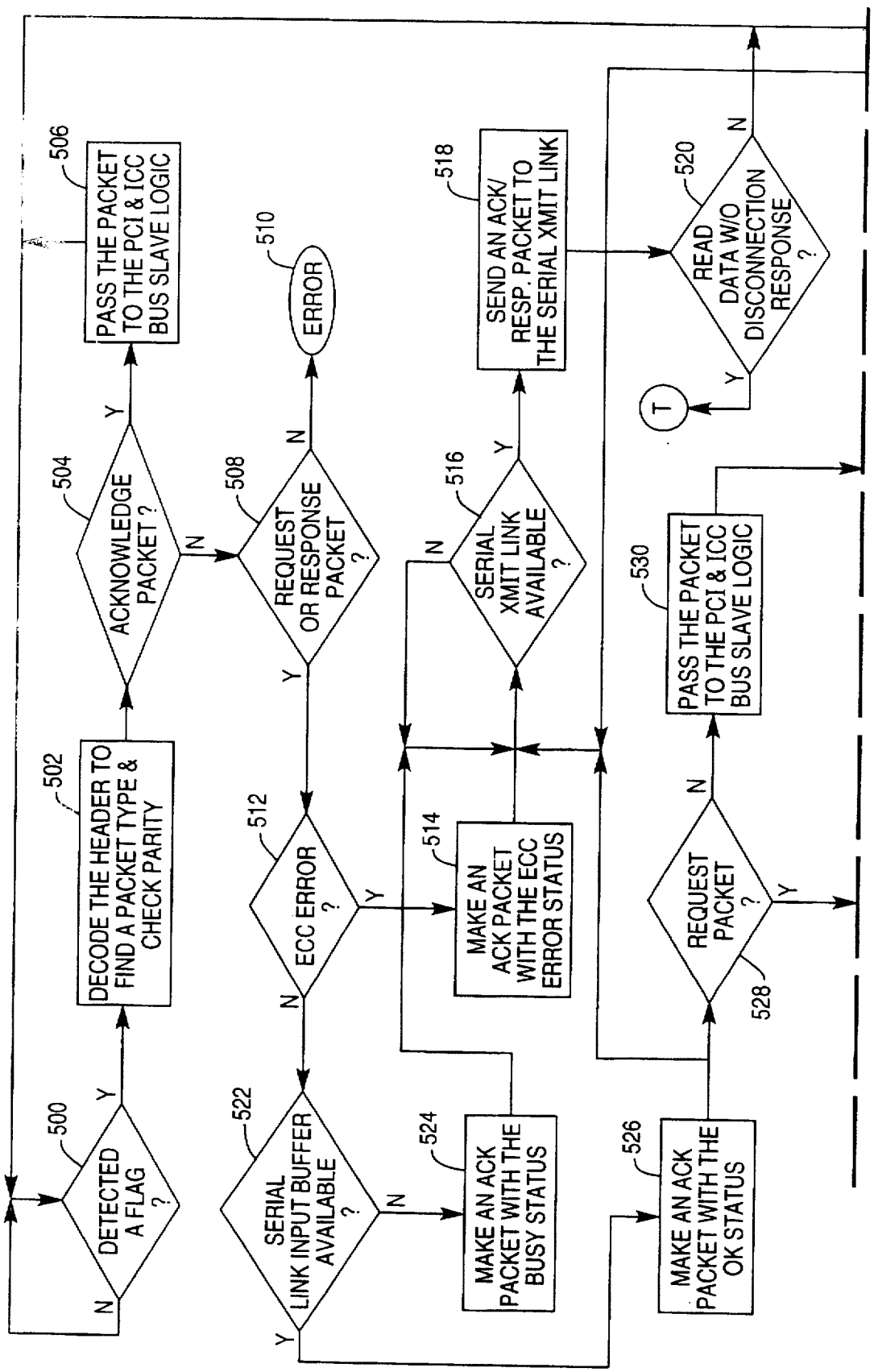
FIGS. 7A–7C together present a flow chart illustrating another embodiment of the invention which employs PCI and ICC bus master and serial link slave operations.
Figure 7B:
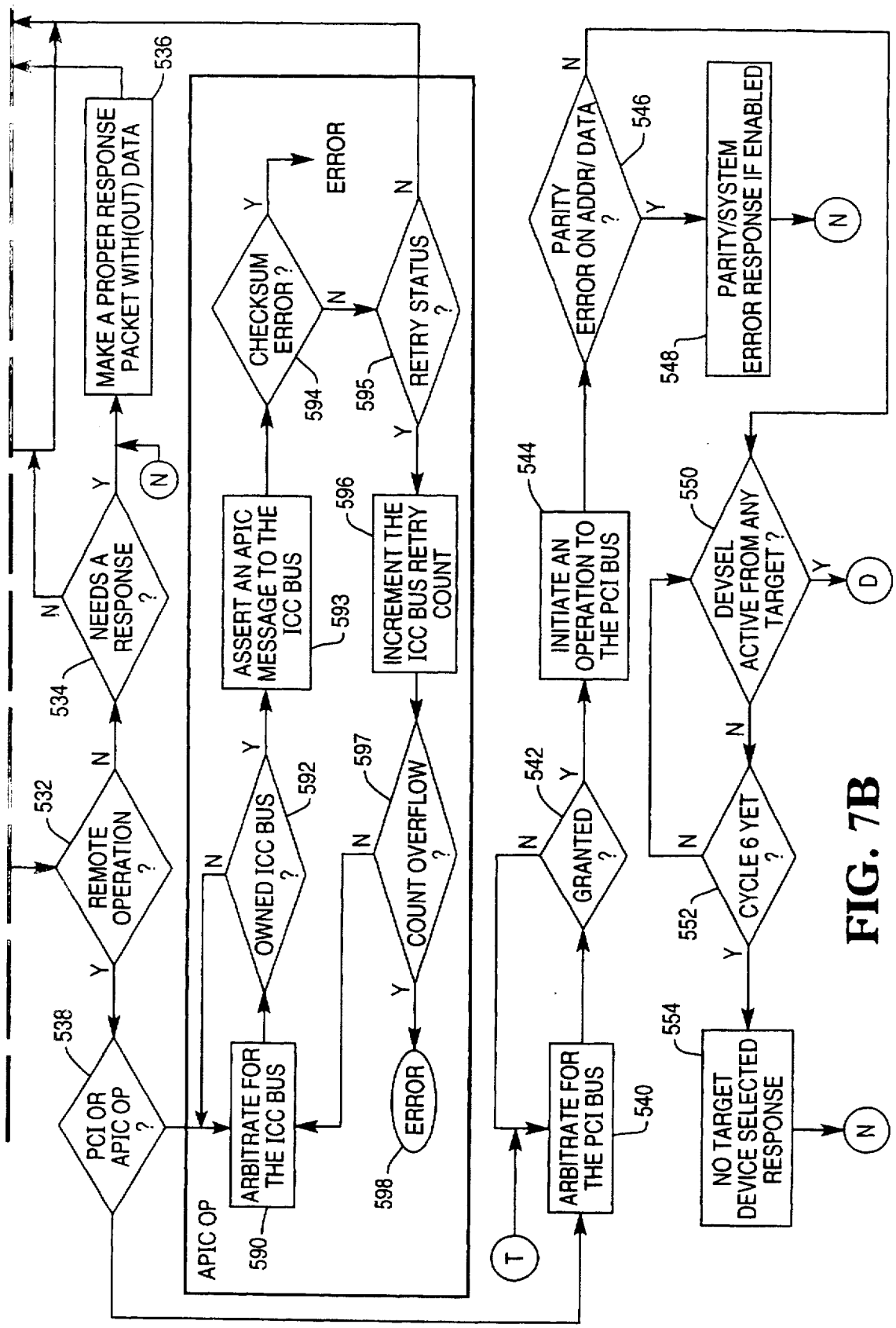
Figure 7C:
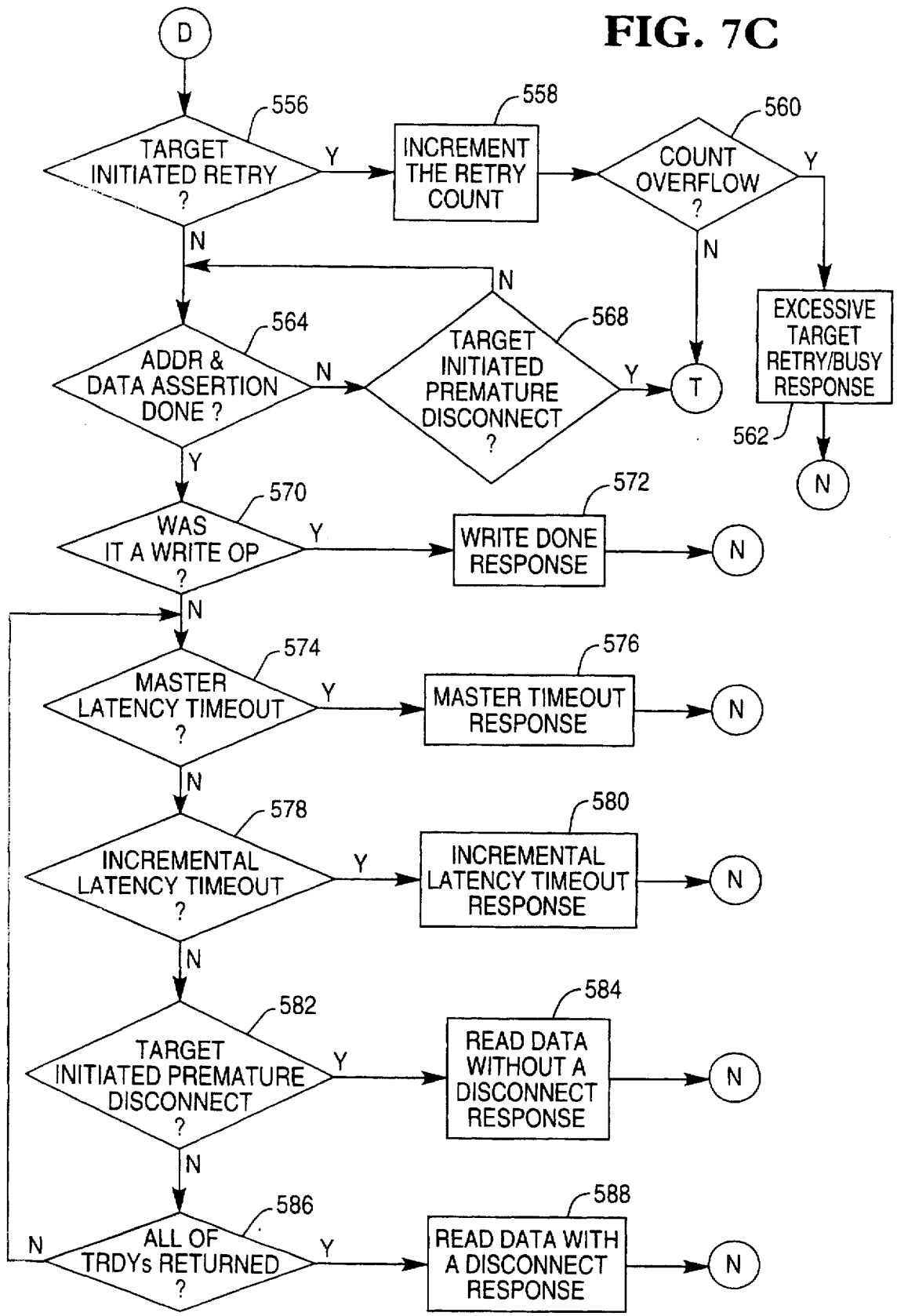

FIGS. 7A–7B is a flow chart illustrating the PCI bus master and serial link slave operations. As shown in FIGS. 7A–7B, the serial link is nominally in the idle state until a flag (consisting of the first 16 bits in the message packet shown in Table 3) is detected 500. Once a flag is detected, the header is decoded to determine which packet type the message is, and the message parity is verified 502. As described in Table 4, the message type is indicated by bits 15–13 of the header, and the parity is verified using bits 1 and 0. If the packet is an acknowledge packet (as indicated by bits 15 and 14 being set to 1 and 0 respectively), the packet is passed to the PCI or ICC bus slave logic previously described 506. If the packet is a request or response packet 508, operations continue, but if the packet is neither, an error message is transmitted 510.

Next, the packet is checked to determine if the error correcting code indicates that the packet has an error 512. If so, an acknowledge packet is generated indicating that an error is present in the packet 514, and this is sent for transmission over the serial link. If a serial transmit link is available 516, the packet is sent to the serial transmit link 518 and the serial link returns to the idle state. If the error correcting code does not indicate a packet error 512, the serial link buffer 320, 332 is checked to determine if it is available to store data 522. If not, an acknowledge packet is generated, indicating that the link is busy 524, and transmitted over the serial link as described above. If a serial link buffer 320, 332 is available, an acknowledge packet indicating that the message was properly received is generated 526, and transmitted over the serial link as described above.

Next, the packet is checked to determine if it is a request packet (indicating that the master is requesting data or an operation from the slave bus) 532. If the message indicates that the packet is not a request packet, but a response packet, the packet is passed to the PCI and ICC bus slave logic 530 and the serial link becomes idle. If the packet is a request packet, it is checked to determine if it requires a remote or a local operation. If the operation is a local operation, the packet is checked to determine if a response is required 534. If no response is required, the serial link becomes idle. If a response is required, a response packet is created and sent over the serial link 536 as described above. If the operation is a remote operation, the operations code of the packet is checked to determine if the packet specifies a PCI or an APIC operation 538. If a PCI operation is selected, the PCI bus is arbitrated for 540, until granted 542. Once the PCI bus is granted, the selected operation is initiated to the PCI bus 544. If a parity error is detected on the address or data 546, an error message indicating this situation is generated 548, a response packet indicating this problem is generated 536, and the packet is transmitted over the serial link as described above. If no parity error is detected, the PCI targets are checked to see if the DEVSEL signal is active. For fast speed operations, this operation is repeated for two cycles, and if no DEVSEL signal becomes active during this time, a "no target device selected" response is generated 554, used to generate a response packet 536, and sent over the serial link as described above. The DEVSEL signal active state is checked more often before generating a "no target device selected" signal for medium, slow, and subtractive decoding operations. For medium speed operations, the DEVSEL signal active state is checked three times, for slow speed operations, the DEVSEL signal active state is checked four times, and for subtractive decoding, the signal state is checked five times, before generating the error message. If the DEVSEL active state is sensed, the PCI interface is checked to see if a target initiated retry was obtained 556. As described in the PCI interface specification incorporated herein by reference, this indicates that termination of the operation is requested because the target is currently in a state which makes it unable to process the transaction. This may be during a non-PCI resource busy condition, or an exclusive access locked condition. Target initiated retry indicates that the transaction is terminated and no data was transferred. If a target initiated retry was obtained 556, the retry counter is incremented 558 and checked for overflow 560. If the counter has not overflowed, the process re-begins anew by arbitrating for the PCI bus 540. If the counter overflowed, an "excessive target retry/busy response" message is generated 562, a response packet is generated with this message 536 (indicated by an operations code for the response packet of 0101 as shown in Table 2), and sent over the serial link as described above. If no target initiated retry indication is received from the PCI bus, the status of the address and data assertion to the PCI bus is checked 564. If the address and data assertion is not completed and not prematurely disconnected 568, the completion of the address and data assertion is rechecked. If the link was prematurely disconnected, the PCI bus is again arbitrated for 540, beginning the whole process anew.

If the requested PCI bus operation was a write operation 570, a "write done" response is generated 572, and a response packet with this information is generated and transmitted over the serial link as described above. If the requested PCI bus operation was a read operation, the process continues until all TRDY (target ready) responses are returned 586. When all TRDY responses are returned, the selected data is read with a disconnect response 588 indicating that all of the requested data has been received. While the status of the TRDY signals is checked, the master latency timer 574 and the incremental latency timer 578 are imposed, each being checked to assure set limits on the appropriate delay for receiving the TRDY signals from the targeted I/O devices. If either has timed out, the appropriate response message is generated, a response packet is formed with the response message, and the packet is transmitted over the serial link as described above. If neither timer has timed out, the process of waiting for the TRDY signals from all of the targeted devices continues. Finally, during this process, if a target initiated premature disconnect is received 582, the data is read without a disconnect response 584, and a packet with the appropriate message is sent to the serial link.

Extension Processor—ICC Controller Operations

If the serial bridge is in a planary implementation (mounted directly on the motherboard), the host side of the bridge can be directly connected to the ICC bus. If the serial bridge is in a non-planary implementation such as on a PCI add-in card, one of the four PCI interrupt signals (INTA#, INTB#, INTC#, and INTD#) are used to deliver interrupts to either the LINTIN0 of a local APIC in a virtual wire mode, or an interrupt input pin of an I/O APIC in the symmetrical I/O mode.

The shaded area of FIGS. 7A–7B shows the ICC controller operations for a planary implementation of the serial bridge. As shown in FIG. 7A–7B, when remote operation is identified 532, the operation is checked to determine if it is a PCI or an APIC operation 538 as indicated by the operations code. If the operation is an ICC operation, the ICC bus is arbitrated for 590 until owned 592, at which time, the APIC message or operation is asserted to the ICC bus 593. If a checksum error is received 594, an error message is generated. If a retry message is not received 595, the process is complete, and the serial link returns to the idle state. If, however, a retry message is received 595, the process is repeated by again arbitrating for the ICC bus 590 until the counter overflows 597. If an excessive number of retry messages are received as indicated by the overflowing of the incremented counter 597, the process is halted, and an error message is generated 598.

It is possible that the local PCI bus 106 and the remote PCI bus 160 will try to lock the PCI bus simultaneously. The serial bridge will resolve this conflict in favor of the remote PCI bus, and allow the bus to be locked. The local PCI bus 106 will then initiate a retry.

Figure 8A:
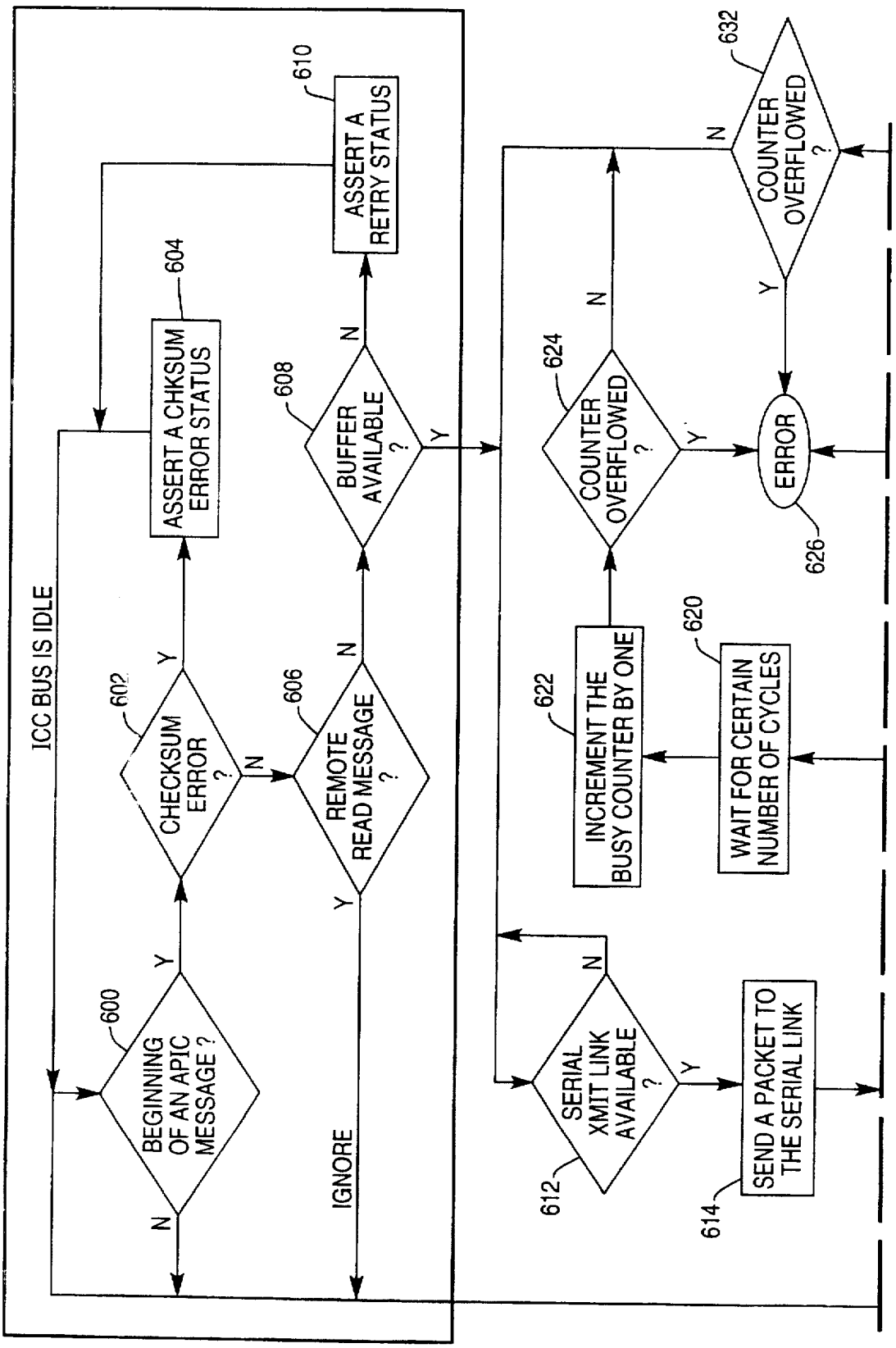
FIGS. 8A and 8B together is a flow chart illustrating the logic flow for an ICC slave operation.
Figure 8B:
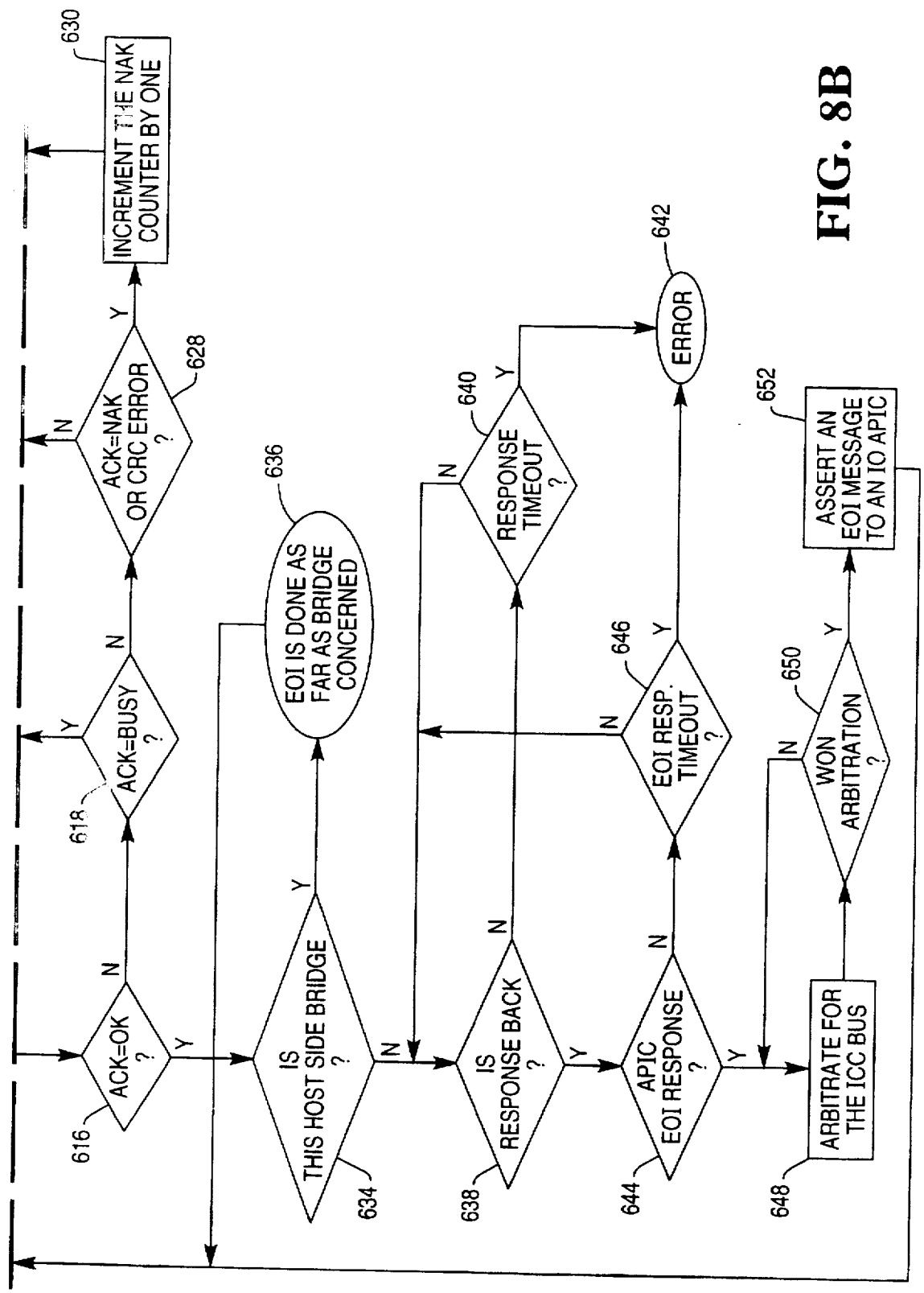

FIGS. 8A–8B is a flow chart illustrating an embodiment of the invention employing interrupt controller communication slave operations. The shaded area of FIGS. 8A–8B shows the ICC controller operations for a planary implementation of the serial bridge. As shown, when an APIC message is received directly from the ICC bus, it is examined for a checksum error 602. If a checksum error is found, a message indicating this condition is asserted and the ICC bus returns to the idle condition. If there is no checksum error, the message is examined to determine if it is a remote read message 606. If so, it is ignored, and the ICC bus returns to the idle state. This is the case because only response packets (from the host side) and request packets (from the remote I/O backplane side) should emanate from the ICC bus. Next, the ICC bus message is stored in a buffer, if available. If a buffer is not available 608, a retry status is asserted to the ICC bus, and the process begins anew with the ICC bus idle.

After the ICC bus message is stored in the buffer, the serial transmit link is examined to determine if it is available 612. If it is available, a packet is generated with a proper operations code and payload and transmitted over the serial link 614. The serial link timer then begins to count, and awaits the acknowledge signal from the serial link. The acknowledge signal may be either "OK," "Busy," "No Acknowledge (NAK), or a "CRC Error. "If the acknowledge signal is "busy" 618, after a specified number of cycles 620, a "busy" counter is incremented by one 622, and checked to see if it has overflowed 624. If the counter has entered an overflow condition, an error message is generated 626. If the counter has not entered an overflow condition, the link is retried by re-examining the serial link to determine if it is available 612. If the acknowledge signal is a "NAK" or a "CRC Error," indicating that the link is garbled, a NAK counter is incremented 630 and checked to see if it has overflowed 632. If the NAK counter has overflowed, an error message is generated 626. If not, the link is retried. If an ACK response "OK" message is received by the host side of the bridge, ICC message was a response packet and the EOI operation is completed, therefore no further serial link operations or messages are necessary. If the response was from the I/O side, the ICC message was a request packet and a data response is expected. An error message is generated 642 if the response packet is not received 638 within the response timeout time 640. Similarly, an error message is generated 642 if the APIC EOI response is not received 644 within the EOI timeout response time 646. When the APIC EOI response is received, the ICC bus is arbitrated for 648, and when the bus is granted 650, the EOI message is asserted to the I/O APIC 652.

Configuration of PCI Modules at Power-Up

Figure 9A:
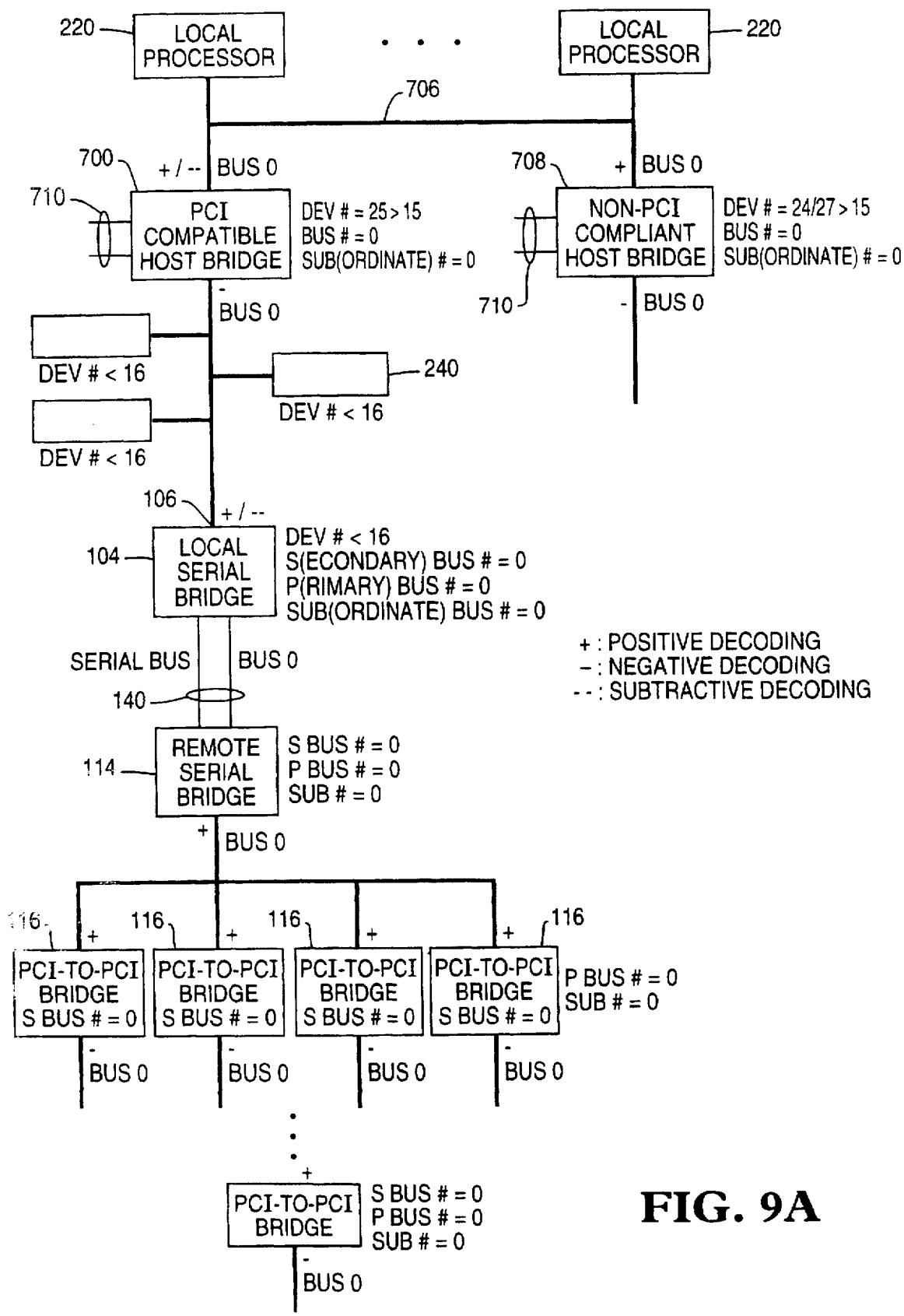
FIG. 9a is a flow chart illustrating the PCI bus and device number assignment before power up.
Figure 9B:
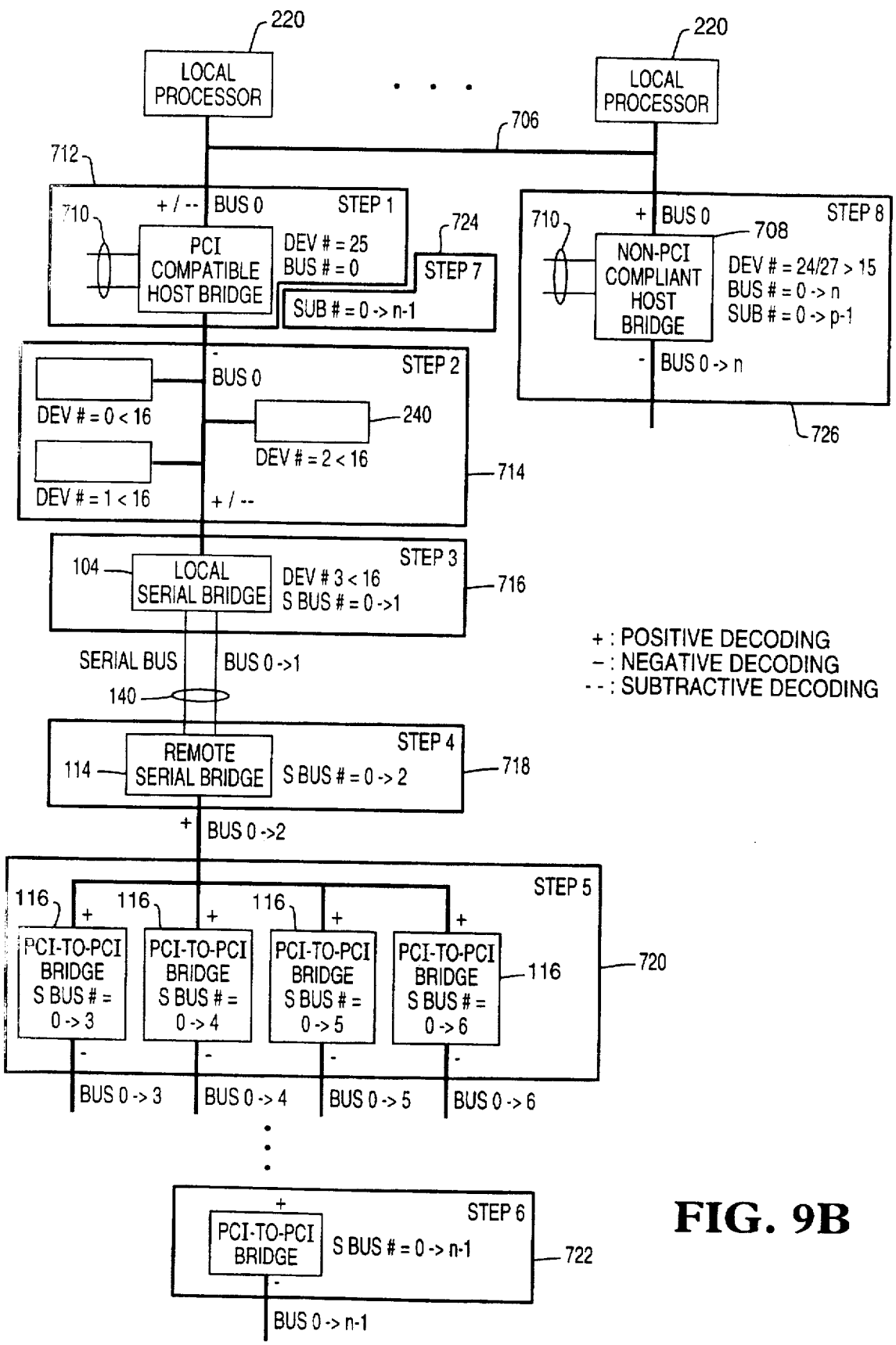
FIG. 9b is a flow chart illustrating the PCI bus and device number assignment during power up.
Figure 9C:
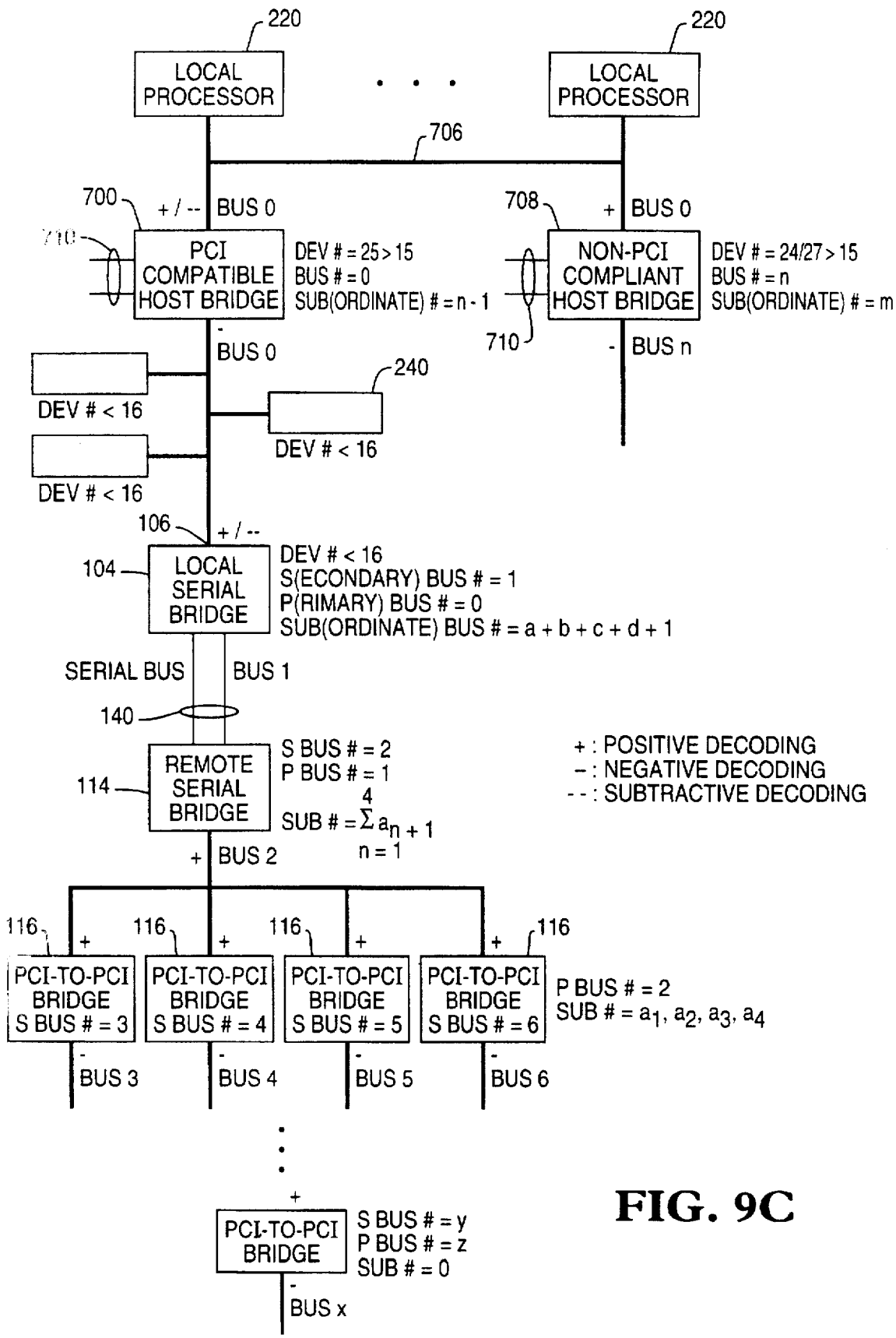
FIG. 9c is a flow chart illustrating the PCI bus and device number assignment after power up.

Since the PCI Local Bus architecture requires a unique designation for each device, a hierarchical PCI bus architecture configuration must be defined upon power-up. FIGS. 9A, 9B and 9C show diagrammatically how this process is completed through the serial link. The situation before power-up is depicted in FIG. 9A. FIG. 9A shows a local serial bridge 104 coupled to a remote serial bridge 114 in the remote I/O backplane 112 by the serial link 140. The local serial bridge 104 is coupled to a PCI compatible host bridge 700, as are other local PCI Boards 702 through the local PCI bus 158. The PCI compatible host bridge 700 also may be coupled to a local processor 220 such as a next-generation P6 device using a local processor bus 706. Non-PCI compatible devices 708 may also be coupled to the local processor bus 706.

All devices are assigned a device number (DEV#). Devices on the main processor bus 706, including the PCI compatible host bridge 700, are assigned unique DEV#s greater than 15. PCI-compliant devices coupled to the PCI compatible host bridge 700, including the local serial bridge 104, are assigned DEV#s equal to or less than 15.

The local serial bridge 104 is assigned a DEV# and a subordinate bus (S Bus) number. The local serial bridge is assigned the highest DEV# of all devices coupled to the PCI compatible host bridge 700. The remote serial bridge 114 and PCI-to-PCI compatible bridges 116 are identified by a secondary bus number (S-Bus), primary bus (P-Bus) number, and subordinate bus (Sub-Bus) number. These identification numbers are stored in the configuration register, and are indicated by the "Subordinate Bus #," "Secondary Bus #," and "Primary Bus #" fields in Table 2.

The steps performed to assign unique numbers to other identities is shown in FIG. 9B. Initially, the PCI compatible host bridge 700 and other devices on the main processor bus 706 are configured using external and internal hardwire straps 710. All PCI compatible host bridges 700 and other devices on the main processor bus 706 are assigned a DEV# greater than 15. This is indicated on FIG. 9B as step one 712. Next, devices on the PCI bus 106 such as the local PCI compliant devices 240 are assigned a unique DEV#. This is indicated on FIG. 9B as step two 714. Next, the local serial bridge 104 is given a secondary bus (S-Bus) number of 1 and a DEV# higher than the other entities on the PCI Bus is assigned to the local serial bridge 104. This is indicated on FIG. 9B as step three 716. Next, the remote serial bridge 114 is assigned the S Bus designation of 2. This is indicated on FIG. 9B as step four 718. Next, PCI-to-PCI bridges 116 are assigned S-Bus numbers of 3, 4, 5, and 6, respectively. This is shown diagrammatically on FIG. 9B as step 5 720. This process continues until an S bus designation is assigned to each secondary bridge. Next, each hierarchical level of PCI bridge structure is assigned a Primary bus (P-bus) number. For example, the local serial bridge 104 is assigned a P-bus number of 0, the remote serial bridge 114 is assigned a P-bus number of 1, and the PCI-to-PCI bridges 116 are assigned a P-bus number of 2. This process is completed until all hierarchical levels receive a P-bus number. Finally, each entity is assigned a subordinate bus (Sub-bus) number, which indicates how many subordinate buses are hierarchically below on the interface. This is indicated by FIG. 9B as step seven 724. Finally, the same process is completed for all other entities on the local processor bus 706. This is indicated on FIG. 9B as step eight 726.

FIG. 9C shows the identification designation assignments when the process is completed. As shown in FIGS. 9A–9C, when the process is completed, each entity in the remote I/O backplane 112 is assigned an S-Bus, P-Bus, and Sub-Bus number. The P-Bus number indicates the hierarchical level of the entity, and the S-Bus number is applied to each entity in numerical sequence. The Sub-Bus number indicates how many subordinate buses exist below each level. For example, the Sub-Bus number assigned to the remote serial bridge 114 is the number of entities hierarchically below it, or $$\sum_{n=1}^{4} a_n + 1.$$

The P-Bus number is 1, indicating that it is hierarchically below the local serial bridge (which has a P-Bus number of 0), and above the PCI-to-PCI bridges 116, which are assigned a P-Bus number of 2. This process is completed for entities on the local processor bus 706, with subordinate entities.

The foregoing description of the preferred embodiment of the invention has been presented for purposes of illustration and description and is not intended to be exhaustive or to limit the invention to the precise form disclosed. Many modifications and variations are possible in light of the above teaching. It is intended that the scope of the invention be limited not by this description, but rather by the claims appended herein.

PCI Configuration Register

TABLE 1

PCI Configuration Register

| 31 | 16 | 08 | 00 | |
|---|---|---|---|---|
| Device ID | | Vendor ID(101Ah) | | 00 |
| PCI Bus Status | | PCI Bus Command | | 04 |
| Class Code(060400h) | | | Revision ID | 08 |
| Reserved (BIST) | Header Type(81h) | Latency Timer(LT) | Cache Line Size | 0C |
| Reserved(Base Address Registers) | | | | 10 |
| Reserved(Base Address Registers) | | | | 14 |
| Secondary LT | Subordinate Bus # | Secondary Bus # | Primary Bus # | 18 |
| Reserved (Secondary Interface Status) | | I/O Limit Address | I/O Base Address | 1C |
| Memory Limit Address | | Memory Base Address | | 20 |
| Reserved (Prefetchable Mem Limit Addr) | | Reserved (Prefetchable Mem Base Addr) | | 24 |
| Reserved (Upper 32-bit Prefetchable Memory Base Address for a DAC cycle) | | | | 28 |
| Reserved (Upper 32-bit Prefetchable Memory Limit Address for a DAC cycle) | | | | 2C |
| Reserved (Upper 16-bit I/O Limit Addr) | | Reserved (Upper 16-bit I/O Base Addr) | | 30 |
| Reserved | | | | 34 |
| Expansion ROM Base Address | | | | 38 |
| Bridge Control | | Interrupt Pin | Interrupt Line | 3C |

TABLE 2

| 31 | 16 | 08 | 00 | |
|---|---|---|---|---|
| PCI Operation through the Serial Link Response Latency Timer | Serial Link Input Buffer Busy Ack Counter | Serial Link NAK Acknowledgement Counter | | 40 |
| End of Interrupt(EOI) Message Timer | Response Latency | APIC Target Retry Counter | | 44 |
| Serial Link Status | Serial Link Control | PCI Bus Control | Target Initiated Retry Counter | 48 |
| Memory attributes for DOS compatible memory region (000080000-0000FFFFFh) | | | | 4C |
| Upstream Memory Limit Address | | Upstream Memory Base Address | | 50 |
| Upper 32-bit Memory Base Address for an upstream DAC cycle | | | | 54 |
| Upper 32-bit Memory Limit Address for an upstream DAC cycle | | | | 58 |
| Memory Hole Limit Address | | Memory Hole Base Address | | 5C |
| Upper 32-bit Memory Hole Base Address for a DAC cycle | | | | 60 |
| Upper 32-bit Memory Hole Limit Address for a DAC cycle | | | | 64 |
| Upper 32-bit Memory Base Address for a DAC cycle | | | | 68 |
| Upper 32-bit Memory Limit Address for a DAC cycle | | | | 6C |
| Upper 32-bit Memory Base Address for a downstream DAC-to-SAC translation | | | | 70 |
| Upper 32-bit Memory Limit Address for a downstream DAC-to-SAC translation | | | | 74 |
| Reserved | Embedded IO APIC Base Address (Default = 0FECh) | Embedded IO APIC ID (0000xxxx) | | 78 |
| Reserved | | | | 7C-FF |

Full size frame format

TABLE 3

| 16 bit | 16 bit | Addr (48/96 bit) | Data (16–384 bits) |
|---|---|---|---|
| Flag | Header | | Payload (optional) |

3 different frames
1. Request frame
   New PCI read

| 16 bit | 16 bit | Addr (48/96 bit) | |
|---|---|---|---|
| Flag | Header | Payload | |

Continued PCI read

| 16 bit | 16 bit | | |
|---|---|---|---|
| Flag | Header | | |

TABLE 3-continued

New PCI write

| 16 bit | 16 bit | Addr (48/96 bit) | Data (48/96/384 bits) |
|---|---|---|---|
| Flag | Header | | Payload |

Continued PCI write

| 16 bit | 16 bit | Data (48/96/384 bits) | |
|---|---|---|---|
| Flag | Header | Payload | |

PCI control message for terminations, errors & aborts

| 16 bit | 16 bit |
|---|---|
| Flag | Header |

APIC short/LP message

| 16 bit | 16 bit | Data (32 bits) |
|---|---|---|

TABLE 3-continued

```
Flag      Header           Payload
2.  Ack frame
16 bit    16 bit
Flag      Header
3.  Response frame
    PCI data response message
16 bit    16 bit           Data (48/96/384 bits)
Flag      Header           Payload
    PCI control message for terminations, errors & aborts
16 bit    16 bit
Flag      Header
    APIC EOI response
16 bit    16 bit           Data (16 bits)
Flag      Header           Payload
```

TABLE 4

| | |
|---|---|
| 2 bits[15:14] | Packet types: |
| | 00 - Request packet (default) |
| | 01 - Response packet |
| | 10 - Ack packet |
| | 11 - Reserved |
| 4 bits[13:10] | Opcodes for a request packet: |
| | 0000 - Reset command (default) |
| | 0001 - Starting a new non-locked PCI command |
| | 0010 - Starting a new locked PCI command |
| | 0011 - Continuing a current PCI command |
| | 0100 - Last phase of a current non-locked command |
| | 0101 - Last phase of a current locked PCI command |
| | 0110 - Abort current operation command |
| | 0111 - Reserved |
| | 1000 - Diagnostic turn-around at the remote link command |
| | 1001 - Buffer flush request command |
| | 101x - APIC short/LP message command (32-bit data payload) |
| | 11xx - Reserved |
| | Opcodes for a response packet: |
| | 0000 - Reserved |
| | 0001 - PCI read data without a disconnect response |
| | 0010 - PCI read data with a disconnect response (last data) |
| | 0011 - Reserved |
| | 0100 - PCI non-posted write completion response |
| | 0101 - Excessive target retry/busy response |
| | 0110 - No target device selected response |
| | 0111 - Data parity error response |
| | 1000 - System error (including address parity error) response |
| | 1001 - Buffer flush acknowledge response |
| | 101x - APIC EOI response (16-bit data payload) |
| | 11xx - Reserved |
| | Status for an ack packet for all commands except turn-around: |
| | 0000 - NAK |
| | 0001 - OK |
| | 0010 - ECC/parity error |
| | 0011 - Bridge is busy (retry) |
| | 0100 - Reserved |
| | 0101 - Reserved |
| | 011x - Reserved |
| | 1xxx - Reserved except 1000 for turn-around command |
| 2 bits[9:8] | Address length for PCI & turn-around commands: |
| | 00 - No address present in payload (default) |
| | 01 - 32-bit PCI address (32-bit addr, 4-bit command, 1 parity, 8-bit ECC(SEC-DED), & 3 padded zeros): total 48 bits |
| | 10 - 64-bit PCI address (2 of 32-bit PCI addr packet): total 96 bits |
| | 11 - Reserved |
| | Buffer designator for Buffer Flush command: |
| | 00 - Reserved |
| | 01 - Upstream buffers only |
| | 10 - Downstream buffers only |
| | 11 - Both upstream & downstream buffers for the GAT |
| 2 bits[7:6] | Data length for PCI & turn-around commands/response: |
| | 00 - No data present in payload (default) |
| | 01 - 32-bit PCI data (32-bit data, 4 BEs, 1 parity, 8-bit ECC(SEC-DED), & 3 padded zeros): total 48 bits |
| | 10 - 64-bit PCI data (2 of 32-bit PCI data packet): total 96 bits |
| | 11 - 32-Byte PCI data (8 of 32-bit PCI data packet): total 384 bits |
| | Data length for APIC command/response: |
| | 00 - Reserved |
| | 01 - 16-bit EOI data (10-bit message & 6-bit ECC(SEC-DED)) |
| | 10 - 32-bit short/LP data (24-bit message & 8-bit ECC) |
| | 11 - Reserved |
| 2 bits[5:4] | Reserved |
| 2 bits[3:2] | Transaction ID bits for request & response packets |
| 2 bits[1:0] | Even parity bits for header (Bit 1 & 0 covers the Bit 15–8 & 7–2 of header, respectively) |

TABLE 5

| PCI Addr/Data Bus or APIC Message bits | ECC bits | | | | | | | |
|---|---|---|---|---|---|---|---|---|
| | 0 | 1 | 2 | 3 | 4 | 5 | 6 | 7 |
| 0 | 0 | 0 | 0 | 1 | 1 | 1 | 0 | 0 |
| 1 | 1 | 0 | 1 | 1 | 0 | 0 | 0 | 0 |
| 2 | 0 | 1 | 1 | 1 | 0 | 0 | 0 | 0 |
| 3 | 0 | 1 | 0 | 0 | 1 | 1 | 0 | 0 |
| 4 | 0 | 0 | 1 | 1 | 1 | 0 | 0 | 0 |
| 5 | 0 | 1 | 1 | 0 | 1 | 0 | 0 | 0 |
| 6 | 1 | 0 | 0 | 1 | 1 | 0 | 0 | 0 |
| 7 | 1 | 0 | 0 | 0 | 0 | 1 | 0 | 0 |
| 8 | 1 | 0 | 1 | 0 | 0 | 1 | 0 | 0 |
| 9 | 0 | 1 | 1 | 0 | 0 | 1 | 0 | 0 |
| 10 | 0 | 1 | 0 | 0 | 0 | 1 | 1 | 0 |
| 11 | 0 | 0 | 0 | 1 | 1 | 0 | 0 | 1 |
| 12 | 0 | 0 | 0 | 1 | 0 | 0 | 1 | 1 |
| 13 | 0 | 1 | 0 | 0 | 1 | 0 | 1 | 0 |
| 14 | 1 | 0 | 0 | 0 | 1 | 0 | 0 | 1 |
| 15 | 0 | 0 | 1 | 1 | 0 | 0 | 0 | 1 |
| 16 | 0 | 1 | 0 | 0 | 0 | 1 | 1 | 0 |
| 17 | 1 | 0 | 0 | 1 | 0 | 0 | 0 | 1 |
| 18 | 0 | 1 | 1 | 0 | 0 | 0 | 0 | 1 |
| 19 | 1 | 0 | 0 | 0 | 0 | 0 | 1 | 1 |
| 20 | 1 | 1 | 0 | 0 | 0 | 0 | 0 | 1 |
| 21 | 0 | 0 | 0 | 0 | 1 | 1 | 1 | 0 |
| 22 | 0 | 0 | 0 | 1 | 0 | 1 | 1 | 0 |
| 23 | 0 | 0 | 1 | 0 | 0 | 1 | 1 | 0 |
| 24 | 1 | 0 | 0 | 0 | 0 | 1 | 0 | 1 |
| 25 | 1 | 0 | 0 | 0 | 0 | 1 | 1 | 0 |
| 26 | 0 | 0 | 1 | 0 | 1 | 1 | 0 | 0 |
| 27 | 0 | 0 | 0 | 1 | 0 | 1 | 0 | 1 |
| 28 | 0 | 1 | 0 | 0 | 1 | 0 | 0 | 1 |
| 29 | 1 | 0 | 0 | 0 | 1 | 0 | 1 | 0 |
| 30 | 0 | 0 | 1 | 1 | 0 | 0 | 1 | 0 |
| 31 | 0 | 1 | 0 | 1 | 0 | 0 | 1 | 0 |
| CMD0/BE0 | 0 | 0 | 0 | 0 | 1 | 1 | 0 | 1 |
| CMD1/BE1 | 0 | 1 | 0 | 1 | 0 | 0 | 0 | 1 |
| CMD2/BE2 | 1 | 0 | 1 | 0 | 0 | 0 | 0 | 1 |
| CMD3/BE3 | 1 | 0 | 1 | 0 | 0 | 0 | 1 | 0 |
| PAR | 1 | 1 | 1 | 0 | 0 | 0 | 0 | 0 |
| Bit weight for 10-bit | 4 | 5 | 6 | 5 | 5 | 5 | — | — |
| Bit weight for 24-bit | 8 | 10 | 9 | 10 | 9 | 9 | 8 | 9 |
| Bit weight for 37-bit | 14 | 14 | 14 | 14 | 14 | 13 | 14 | 14 |

TABLE 6

| Bit | Function | Default |
|---|---|---|
| 15 | If this bit is set to one, then all memory read operations within the upstream address range will be forced to be retried until the data is available to | 0 |

TABLE 6-continued

| Bit | Function | Default |
|---|---|---|
|  | this bridge and else, no target initiated retry operation will be forced for above read operations. The purpose of this option is to maximize the PCI bus operation will be forced for above read operations. utilization. |  |
| 14 | If this bit is set to one, then the host side of the bridge will assert the DEVSEL# signal when no target device claims it (subtractive decoding) and else, only positive decoding will be supported. This control bit will support an option to connect a compatibility bridge as a subordinate to the serial bridge. | 0 |
| 13 | If this bit is set to one, then the host side of bridge does not have a direct connection to the ICC bus which is used either to assert an interrupt reporting message to local APICs or to receive an EOI message from a local APIC. In this mode, it has to use one of 4 PCI interrupt signals to report an interrupt and also generate an EOI message to the ICC bus of IO side bridge after detecting a predefined operation (e.g. a CSR read to the specific register) which tries to signal the asserted interrupt has been served. When this bit is set to zero, then there is a direct connection to the ICC bus and neither to use a PCI interrupt signal to report an interrupt nor to generate an EOI message to the IO side of bridge since both will be initiated by either an IO APIC or a local APIC through the ICC bus and this bridge works as a true ICC bridge. | 0 |
| 12 | If this bit is set to one, then the memory attribute bits in the configuration register 4C-4Fh will be enabled and else, the bits in this configuration register will be ignored. | 0 |
| 11 | If this bit is set to one, then a downstream DAC (Dual Address Cycle) operation will be translated into a SAC (Single Address Cycle) in other side when its upper 32-bit address falls into the address range defined in the Configuration register 70 through 77. Else, a downstream DAC will be propagated through to other side of the bridge without changing into a SAC if its address falls into the address range defined in the register 68-6F & 20-23. For all SAC operations, the address ranges defined in the register 54-5B & 60-77 are not used at all. | 0 |
| 10-8 | Reserved | 0 |

What is claimed is:

1. A method of extending one or more local buses to a remote I/O backplane comprising the steps of:
   receiving a message from a local bus;
   generating a serial request packet from the local bus message when the local bus message is targeted to the remote I/O backplane;
   transmitting the serial request packet to the remote I/O backplane over a serial link;
   receiving a serial response packet from the remote I/O backplane when specified by the serial request packet over the serial link, said serial response packet defining a local bus operation; and
   performing the local bus operation indicated by the serial response packet.

2. The method of claim 1 wherein the method further comprises the steps of:
   receiving a serial request acknowledge packet from the remote I/O backplane after transmitting the serial request packet to the remote I/O backplane, said serial request acknowledge packet indicating whether the remote I/O backplane received the serial request packet; and
   transmitting a serial response acknowledge packet to the remote I/O backplane over the serial link after receiving the serial response packet.

3. The method of claim 2 wherein the steps of transmitting the serial request packet comprises the steps of:
   determining if a buffer is available;
   storing the serial request packet in a buffer when the buffer is available; and
   transmitting the serial request packet from the buffer to the remote I/O backplane over the serial link when the serial link is available.

4. The method of claim 3 wherein the step of transmitting the serial request packet is repeated until the serial request acknowledge packet indicates that the serial request message was received by the remote I/O backplane.

5. The method of claim 2 wherein the step of transmitting the serial response acknowledge packet comprises the steps of:
   determining if a buffer is available;
   storing the serial response acknowledge packet in a buffer when the buffer is available; and
   transmitting the serial response acknowledge packet from the buffer to the remote I/O backplane over the serial link when the serial link is available.

6. The method of claim 2 wherein the step of generating a serial response acknowledge packet comprises the steps of:
   generating a command operations code defining serial link commands; and
   combining the local bus message with the command operations code, thereby creating a serial response acknowledge packet.

7. The method of claim 2 wherein the serial response acknowledge packet comprises a plurality of data packets, each data packet formed by performing the steps of:
   segmenting the local bus message into local bus message segments if the serial response acknowledge packet exceeds a predefined message length;
   generating a segmented message command operations code defining serial link commands and relating the associated local bus message segments; and
   combining the segmented local bus messages with the associated segmented message command operations code, thereby generating a data packet.

8. The method of claim 1 wherein the step of generating a serial request packet comprises the steps of:
   generating a command operations code defining serial link commands; and
   combining the local bus message with the command operations code, thereby creating a serial request packet.

9. The method of claim 1 wherein the serial request packet comprises a plurality of data packets, each data packet formed by performing the steps of:
   segmenting the local bus message into local bus message segments if the serial request packet exceeds a predefined message length;
   generating a segmented message command operations code defining serial link commands and relating the associated local bus message segments; and
   combining the segmented local bus messages with the associated segmented message command operations code, thereby generating a data packet.

10. The method of claim 1 wherein the serial response packet comprises a plurality of serial response data packets each comprising an operations code and data, and the step of receiving the serial response packet comprising the steps of:
    decoding the operations code to determine if the serial response packet extends to multiple serial response data packets; and receiving the plurality of data packets until the operations code indicates that the last data packet was received.

11. The method of claim 1 wherein the serial response packet comprises a response message and response operations code, and the step of performing the local bus operation indicated by the signal response packet comprising the steps of:

reading the response operations code;

interpreting the response operations code to determine the local bus operation and the response message; and performing the local bus operation.

12. The method of claim 11 wherein the step of performing the bus operation comprises the steps of:

arbitrating for the local bus; and initiating the local bus operation when the local bus has been granted.

13. The method of claim 12 wherein the plurality of local buses comprises a PCI bus, an ICC bus, and a sideband signal bus, and the step of prioritizing messages comprises the steps of:

granting sideband signal bus messages high priority;

granting ICC bus messages moderate priority; and granting PCI bus messages local priority.

14. The method of claim 13 wherein the assigning step comprises the steps of:

assigning a sequential identity to each remote I/O backplane entity; and assigning an hierarchical identity to each remote I/O backplane entity.

15. The method of claim 1 further comprising the steps of:

prioritizing messages from the local buses when a plurality of local bus messages have been receiving; and selecting the local bus message with the highest priority for transmission.

16. The method of claim 1 wherein the remote I/O backplane comprises one or more remote entities and the method further comprises the step of assigning unique identities to each remote I/O backplane entity.

17. A method of extending one or more local buses to a remote I/O backplane, comprising the steps of:

receiving a serial request packet defining a local bus operation from the remote I/O backplane over a serial link;

performing the local bus operation; and transmitting a serial response packet to the remote I/O backplane.

18. The method of claim 17, further comprising the steps of:

transmitting a serial request acknowledge packet to the remote I/O backplane after receiving the serial request packet over the serial link; and receiving a serial response acknowledge packet from the remote I/O back plane over the serial link.

19. The method of claim 18 wherein the step of transmitting a serial request acknowledge packet to the remote I/O backplane comprises the steps of:

decoding the serial request packet to determine if data is targeted to a local bus;

determining if a buffer is available;

storing the serial request packet in a buffer when the buffer is available; and transmitting the serial request acknowledge packet to the remote I/O backplane when the data is targeted to the local bus and the serial link is available.

20. The method of claim 18 wherein the step of transmitting the serial request acknowledge packet further comprises the step of transmitting a busy message to the remote I/O backplane if the buffer is not available.

21. The method of claim 17 wherein the serial request packet comprises one or more serial request data packets, each comprising an operations code and data, and the step of receiving the serial request packet comprises the steps of:

decoding the operations code to determine if the serial request packet extends to more than one serial request data packet; and receiving the plurality of data packets until the operations code indicates that the last data packet was received.

22. The method of claim 17 wherein the step of performing the bus operation comprises the steps of:

arbitrating for the local bus;

initiating the local bus operation;

receiving a local bus operation response; and generating a serial response packet comprising the local bus operation response.

23. The method of claim 22 wherein the step of generating a serial response packet comprises the steps of:

generating a command operations code defining serial link commands; and combining the local bus operation response with the command operations code, thereby generating the serial response packet.

24. The method of claim 22 wherein the step of generating a serial response packet comprises the steps of:

segmenting the local bus operation response if the serial response packet exceeds a predefined message length;

generating a segmented message command operations code defining serial link commands and relating the associated local bus operation response message segments; and combining the segmented local bus operation response message segments and the segmented message command operations code, thereby generating a serial response packet.

25. The method of claim 17 wherein the method further comprises the step of assigning unique identities to each backplane bus.

26. The method of claim 25 wherein the assigning step comprises the steps of:

assigning a sequential identity to each backplane bus; and assigning an hierarchical identity to each backplane bus.

27. A method of extending one or more local buses in a processor to a remote I/O backplane having one or more backplane buses, comprising the steps of:

receiving a message from a backplane bus;

generating a serial request packet from the backplane bus message when the backplane bus message is targeted to a local bus;

transmitting the serial request packet to the local bus over a serial link;

receiving a serial response packet from the local bus when specified by the serial request packet over the serial link, said serial response packet defining a backplane bus operation; and performing the remote bus operation indicated by the serial response packet.

28. The method of claim 27, further comprising the steps of:

receiving a serial request acknowledge packet from the local bus after transmitting the serial request packet to the local bus, said serial request acknowledge packet indicating whether the local bus received the serial request packet; and transmitting a serial response acknowledge packet to the local bus over the serial link after receiving the serial response packet.

29. The method of claim 28 wherein the step of transmitting the serial response acknowledge packet comprises the steps of:

determining if a buffer is available;

storing the serial response acknowledge packet in a buffer when the buffer is available; and transmitting the serial response acknowledge packet from the buffer to the processor over the serial link when the serial link is available.

30. The method of claim 28 wherein the step of generating a serial response acknowledge packet comprises the steps of:

generating a command operations code defining serial link commands; and combining the remote bus message with the command operations code, thereby creating a serial response acknowledge packet.

31. The method of claim 28 wherein the serial response acknowledge packet comprises a plurality of data packets, each data packet formed by performing the steps of:

segmenting the remote bus message into remote bus message segments if the serial response acknowledge packet exceeds a predefined message length;

generating a segmented message command operations code defining serial link commands and relating the associated remote bus message segments; and combining the segmented remote bus messages with the associated segmented message command operations code, thereby generating a data packet.

32. The method of claim 27 wherein the step of transmitting the serial request packet comprises the steps of:

determining if a buffer is available;

storing the serial request packet in a buffer when the buffer is available; and transmitting the serial request packet from the buffer to the processor over the serial link when the serial link is available.

33. The method of claim 32 wherein the step of transmitting the serial request packet is repeated until the serial request acknowledge packet indicates that the serial request packet was received by the processor.

34. The method of claim 27 wherein the step of generating a serial request packet comprises the steps of:

generating a command operations code defining serial link commands; and combining the backplane bus message with the command operations code, thereby creating a serial request packet.

35. The method of claim 27 wherein the serial request packet comprises a plurality of data packets, each data packet formed by performing the steps of:

segmenting the backplane bus message into backplane bus message segments if the serial request packet exceeds a predefined length;

generating a segmented message command operations code defining serial link commands and relating the associated backplane bus message segments; and combining the segmented message command operations code with the associated backplane bus message segments, thereby generating a data packet.

36. The method of claim 27 wherein the serial response packet comprises a plurality of serial response data packets each comprising an operations code and data, and the step of receiving the serial response packet comprises the steps of:

decoding the operations code to determine if the serial response packet extends to multiple serial response data packets; and receiving the plurality of data packets until the operations code indicates that the last data packet was received.

37. The method of claim 27 wherein the serial response packet comprises a response message and a response operations code, and the step of performing the local bus operation indicated by the signal response packet comprises the steps of:

reading the response operations code;

interpreting the response operations code to determine the local bus operation and the response message; and performing the local bus operation.

38. The method of claim 37 wherein the step of performing the bus operation comprises the steps of:

arbitrating for the local bus; and initiating the local bus operation when the local bus has been granted.

39. The method of claim 27, further comprising the steps of:

prioritizing messages from the local buses when a plurality of local bus messages have been received; and selecting the local bus message when the highest priority for transmission.

40. The method of claim 39 wherein the plurality of remote buses comprises a PCI bus, an ICC bus, and a sideband signal bus, and the step of prioritizing messages comprises the steps of:

granting sideband signal bus messages high priority;

granting ICC bus messages moderate priority; and granting PCI bus messages low priority.

41. The method of claim 40 wherein the method further comprises the step of assigning unique identities for each remote I/O backplane entity.

42. The method of claim 40 wherein the assigning step comprises the steps of:

assigning a sequential identity to each remote I/O backplane bus; and assigning an hierarchical identity of each remote I/O packplane bus.

43. A method of extending one or more local buses in a processor to a remote I/O backplane having one or more backplane buses, comprising the steps of:

receiving a serial request packet defining a remote bus operation from the processor over a serial link;

performing the backplane bus operation; and transmitting a serial response packet to the processor over the serial link.

44. The method of claim 43, further comprising the steps of:

transmitting a serial request acknowledge packet to the processor after receiving the serial request packet over the serial link; and receiving a serial response acknowledge packet from the processor over the serial link after transmitting a serial response packet to the processor over the serial link.

45. The method of claim 44 wherein the step of transmitting a serial request acknowledge packet to the processor comprises the steps of:

decoding the serial request packet to determine if data is targeted to a backplane bus;

determining if a buffer is available;

storing the serial request acknowledge packet in the buffer when the buffer is available; and transmitting the serial request acknowledge packet to the remote I/O backplane when the data is targeted to the backplane bus and the buffer is available.

46. The method of claim 44 wherein the step of transmitting the serial request acknowledge packet further comprises the step of transmitting a busy message to the local bus if the buffer is not available.

47. The method of claim 43 wherein the serial request packet comprises one or more serial request data packets, each comprising an operations code and data, and the step of receiving the serial request packet comprises the steps of:

decoding the operations code to determine if the serial request packet extends to more than one serial request data packet; and receiving the plurality of data packets until the operations code indicates that the last data packet was received.

48. The method of claim 43 wherein the step of performing the bus operation comprises the steps of:

arbitrating for the backplane bus;

initiating the backplane bus operation;

receiving a backplane bus operation response; and generating a serial response packet comprising the backplane bus operation response.

49. The method of claim 48 wherein the step of generating a serial response packet comprises the steps of:

generating a command operations code defining serial link commands; and combining the backplane bus operation response with the command operations code, thereby generating the serial response packet.

50. The method of claim 48 wherein the step of generating a serial response packet comprises the steps of:

segmenting the backplane bus operation response if the serial response packet exceeds a predefined message length;

generating segmented backplane bus operations code defining serial link commands and relating the local bus operation response message segments; and combining the segmented local bus operation response message segments and the segmented message command operations code, thereby generating a serial response packet.

51. The method of claim 43 wherein the method further comprises the steps of assigning a unique entity to each backplane bus.

52. The method of claim 51 wherein the assigning step comprises the steps of:

assigning a sequential identity to each backplane bus; and
assigning an hierarchical identity to each backplane bus.

53. An apparatus for extending a processor comprising a PCI bus to a remote I/O backplane over a serial link, comprising:

a PCI bus interface processor coupled to the PCI bus, a serial link processor for translating bus messages into serial link interface messages and translating serial link interface messages into a bus message, said serial link processor comprising;

means for determining the destination of the bus message, said determining means coupled to the PCI bus interface;

means for generating a serial request packet from the bus message, coupled to the determining means; and means for performing the bus operation defined by the serial response packet; and a serial link interface, coupled to the serial link processor and the serial link, said serial link interface comprising:

a transmitter for transmitting a serial request packet and a serial response acknowledge packet over the serial link, the transmitting means coupled to the serial link; and a receiver for receiving a serial request acknowledge packet and a serial response packet over the serial link, the receiving means coupled to the serial link.

54. The apparatus of claim 53 wherein said generating means comprises:

means for generating a command operations code defining serial link commands; and means for combining the bus message with the command operations code, thereby generating a serial request packet.

55. The apparatus of claim 53 wherein said serial request packet comprises a plurality of data packets, and the generating means comprises:

means for segmenting the bus message into bus message segments if the serial request package exceeds a predefined message length, coupled to the determining means;

means for generating a segmented message command operations code defining serial link commands and relating the associated bus message segments; and means for combining the segmented bus messages with the associated segmented message command operations code, thereby generating said data packets, said combining means coupled to the generating means and the segmenting means.

56. The apparatus of claim 53 wherein the serial link processor further comprises a means for storing data in the buffer when the serial link is unavailable.

57. The apparatus of claim 53 wherein the serial link interface further comprises means for repeatedly transmitting the serial request packet until the serial acknowledge packet is received.

58. The apparatus of claim 53 wherein the serial response packet further comprises a response message and a response operations code, and the translator further comprises:

means for reading the response operations code;

means for interpreting the response operations code to determine the destination of the signal response; and means for translating the response message into bus-compatible data, coupled to the reading means and the interpreting means.

59. The apparatus of claim 53 wherein the serial link processor further comprises a module for prioritizing bus messages.

60. An apparatus for extending a processor comprising a PCI bus to a remote I/O backplane over a serial link, comprising:

a PCI bus interface processor coupled to the PCI bus:

a serial link processor for translating bus messages into serial link interface messages and translating serial link interface messages into a bus message;

a serial link interface, coupled to the serial link processor and the serial link; and an ICC bus interface coupled to the bus.

61. An apparatus for extending a processor comprising a PCI bus to a remote I/O backplane over a serial link, comprising;

a PCI bus interface processor coupled to the PCI bus;

a serial link processor for translating bus messages into serial link interface messages and translating serial link interface messages into a bus message; said serial link processor comprising;

a decoder for interpreting the serial request packet to determine if a bus operation is required; and means for performing the bus operation defined by the serial request packet; and a serial link interface, coupled to the serial link processor and the serial link; said serial link interface comprising;

a transmitter for transmitting a serial response acknowledge packet and a serial request acknowledge packet over the serial link, coupled to the serial link; and a receiver for receiving a serial response acknowledge packet over the serial link, coupled to the serial link.

62. The apparatus of claim 61 wherein the bus operation performing means comprises:

a bus arbitrator;

means for initiating the bus operation;

means for receiving a bus operation response; and means for generating a serial response packet comprising the bus operation response, coupled to the serial link interface.

63. An apparatus for extending a processor comprising a PCI and an ICC bus to a remote I/O backplane over a serial link, comprising:

a PCI bus interface processor coupled to the PCI bus;

a serial link processor for translating bus messages into serial link interface messages and translating serial link interface messages into a bus message;

a serial link interface, coupled to the serial link processor and the serial link; and an ICC interface processor, coupled to the serial link processor and the ICC bus.

64. An apparatus for extending a processor comprising a PCI bus and a JTAG bus to a remote I/O backplane over a serial link, comprising:

a PCI bus interface processor coupled to the PCI bus;

a serial link processor for translating bus messages into serial link interface messages and translating serial link interface messages into a bus message;

a serial link interface, coupled to the serial link processor and the serial link; and a JTAG bus interface processor coupled to the JTAG bus and the serial interface processor.

65. An apparatus for extending a processor comprising a PCI bus and a sideband signal bus to a remote I/O backplane over a serial link, comprising:

a PCI bus interface processor coupled to the PCI bus;

a serial link processor for translating bus messages into serial link interface messages and translating serial link interface messages into a bus message;

a serial link interface, coupled to the serial link processor and the serial link; and a sideband interface, coupled to the sideband signal bus and the PCI interface processor.

* * * * *